United States Patent [19]

Carr et al.

[11] Patent Number: 5,740,433
[45] Date of Patent: Apr. 14, 1998

[54] REMOTE DUPLICATE DATABASE FACILITY WITH IMPROVED THROUGHPUT AND FAULT TOLERANCE

[75] Inventors: Richard W. Carr, Palo Alto, Calif.; Brian Garrard, Speldhurst, England; Malcolm Mosher, Jr., Los Gatos, Calif.

[73] Assignee: Tandem Computers, Inc., Cupertino, Calif.

[21] Appl. No.: 704,111

[22] Filed: Aug. 28, 1996

Related U.S. Application Data

[63] Continuation of Ser. No. 377,152, Jan. 24, 1995, abandoned.
[51] Int. Cl.$^6$ .................................................. G06F 12/30
[52] U.S. Cl. ...................... 395/618; 395/617; 395/620; 395/182.14
[58] Field of Search ................................. 395/617, 618, 395/620, 182.14

[56] References Cited

U.S. PATENT DOCUMENTS

| | | | |
|---|---|---|---|
| 5,043,866 | 8/1991 | Myre, Jr. et al. | 395/618 |
| 5,170,480 | 12/1992 | Mohan et al. | 395/617 |
| 5,247,664 | 9/1993 | Thompson et al. | 395/600 |
| 5,276,871 | 1/1994 | Howarth | 395/617 |
| 5,404,508 | 4/1995 | Konrad et al. | 395/618 |
| 5,412,801 | 5/1995 | De Remer et al. | 395/182.18 |
| 5,530,855 | 6/1996 | Satoh et al. | 395/617 |
| 5,561,795 | 10/1996 | Sarkar | 395/618 |
| 5,640,561 | 6/1997 | Satoh et al. | 395/618 |
| 5,673,382 | 9/1997 | Cannon et al. | 395/182.04 |

OTHER PUBLICATIONS

Guerrero, Jorge, "RDF: An Overview", Tandem Systems Review, Oct. 1991, pp. 34–43.

Senf, Wouter, et al., "RDF Synchronization", Tandem Systems Overview, Summer 1992, pp. 6–23.

*Primary Examiner*—Paul R. Lintz
*Attorney, Agent, or Firm*—Gary S. Williams; Flehr Hohbach Test Albritton & Herbert LLP

[57] ABSTRACT

A local computer system has a local database, application programs that modify the database and a transaction manager that stores audit records in a local audit trail reflecting the application programs' modifications to the local database. A remote computer system has a backup database. A remote data duplication facility (RDF) is distributed in the local computer system and the remote computer for maintaining synchronization of the backup database with the local database. The RDF has an extractor process and a receiver process. The extractor process has multiple updater processes, extracts audit records from the local audit trail and transmits them to the receiver process, which distributes them to the updater processes which in tuna initiate redo operations of database modifications in at least a subset of the audit records against the backup database. Should the audit records not arrive in proper sequence, the receiver transmits an error message to the extractor process, which extracts audit records from a restart audit trail position value.

36 Claims, 19 Drawing Sheets

Updater Status Table 400

| Updater | IT File | Current StopPoint Location in IT File | Last Reported MIT position | Last Reported IT file position |
|---|---|---|---|---|
| 1 | MIT | | | |
| 2 | MIT | | | |
| 3 | MIT | | | |
| 4 | AIT1 | | | |
| 5 | AIT1 | | | |
| ⋮ | ⋮ | ⋮ | ⋮ | ⋮ |

Transaction Status Table (TST) 144

414 — MIT position for updating TST

| Trans. ID | Status (Commit or Abort) | MIT Position |
|---|---|---|
| S100003 | | |
| S100004 | | |
| S100006 | | |
| ⋮ | ⋮ | |
| S100256 | | |

REMOTE DUPLICATE DATABASE FACILITY WITH IMPROVED THROUGHPUT AND FAULT TOLERANCE

This application is a continuation of application Ser. No. 08/377,152, filed Jan. 24, 1995, now abandoned.

The present invention relates generally to database management systems and particularly to a database management system in which a "remote duplicate database facility" monitors changes made to a database on a local system and maintains a copy of that database on a remote system.

BACKGROUND OF THE INVENTION

The purpose of a "remote duplicate database facility" (hereinafter an "RDF") in a database management system (DBMS) is to provide a higher degree of fault tolerance than can be provided through conventional fault tolerance system architectures involving the use of "shadowed" disk storage (i.e., storing all data to two disk storage systems simultaneously) and parallel computers where one computer takes over if the other fails.

In conventional distributed computer systems designed to perform transaction management, one or more transaction managers (i.e., management processes) generate and store transaction audit entries in an audit trail. Most audit entries denote a database table record event, such as an addition, deletion or modification of a specified database table record in a specified database table. Other audit entries indicate that a specified transaction has committed or aborted. Yet other types of transactions, such as transactions involving restructurings of the database tables (e.g., adding an additional alternate index to a database table or changing the number of partitions for a database table), while still other audit entries may denote other events not relevant to this document.

An RDF system monitors the information added to the audit trail so as to monitor changes made to a database on a primary system (often called the local system), and maintains a backup copy of that database on a remote system by applying the same changes to the database on a remotely located backup system (often called the remote system). In this manner the backup database on the remote system is kept continuously up to date by the RDF with changes made to the local system.

The remote system is preferably located sufficiently far from the primary system that even a widespread disaster, such as loss of power over a large geographic area, that adversely affects the primary system will not affect the remote backup system. The use of an RDF system makes it possible to switch business applications from the primary system to the remote backup system in a short period of time, preferably in a matter of minutes. Additionally, if a planned shutdown of the primary system is necessary, business applications can be stopped and immediately restarted on the backup system to access the replicated database.

Prior Art Tandem RDF System

FIGS. 1 and 2 represent the basic architecture of Tandem Computer's RDF system prior to the present invention. The computer system 100 shown in FIG. 1 has a transaction management facility 102 that writes audit entries to a master audit trail (MAT) 104. The audit entries indicate changes made to "audited files" on "RDF protected volumes" 106 of a primary database 108 on a primary system 110. All RDF protected volumes are configured to write all transaction audit records to the MAT 104.

The RDF system 120 includes processes on both the primary (local) computer system 110 and a remote backup computer system 122. The RDF 120 maintains a replicated database 124 by monitoring changes made to "audited files" on "RDF protected volumes" 106 on a primary system and applying those changes to corresponding backup volumes 126 on the backup computer system 122. An "audited file" (sometimes called an "RDF audited file") is a file for which RDF protection has been enabled, and an "RDF protected volume" is a logical unit of disk storage for which RDF protection has been enabled. Thus, an RDF protected volume may include both audited and unaudited files.

On the primary computer system 110, an RDF extractor process 130 reads the master audit trail (MAT) 104, which is a log maintained by the transaction management facility (TMF) of all database transactions that affect audited files, and sends any audit records associated with RDF-protected volumes to an RDF receiver process 132 on the backup computer system.

The MAT 104 is stored as a series of files with sequentially numbered file names. The MAT files are all of a fixed size (configurable for each system), such as 64 Mbytes. The TMF 102 and Extractor 130 both are programmed to progress automatically (and independently) from one MAT file to the next. The extractor process 130 appends a timestamp to each audit record that it extracts from the master audit trail 104. The appended timestamp is the timestamp of the last transaction to complete prior to generation of the audit record in the MAT 104. The resulting record is called an audit image record, or image record. The extractor process stores each audit image record in a message buffer 142 having a size of about 28K bytes in the preferred embodiment. The extractor process reads up to 28K bytes of audit records from the MAT 104 at a time, and after each such read operation the resulting message buffer 142 is transmitted to the receiver process 132. The extractor process 130 waits for an acknowledgment message from the receiver process 132 before continuing its processing of audit records in the MAT 104.

The receiver process 132 writes all audit records received from the extractor to a master Image Trail (MIT) 136 as well as to zero or more auxiliary Image Trails (AITs) 138. The contents of all the image trails 136, 138 are identical. The RDF updater processes 134 on the remote backup system 122 read the audit records from either a master image trail 136 or an auxiliary image trail 138 and apply only audit records associated with committed transactions to the backup database 124. Each RDF-protected volume 106 on the primary computer system 110 has its own updater process 134 on the backup computer system 110 that is responsible for applying audit records to the corresponding backup volume 126 on the backup computer system 110 so as to replicate the audit protected files on that volume. Audit records associated with aborted transactions on the primary system are never applied to the database on the remote backup computer system 122.

The audit image records in each image trail 136, 138 are typically read and processed by two to ten updaters 134. Each updater 134 reads all the audit image records in the corresponding image trail, but utilizes only the audit image records associated with the primary disk volume 106 for which that updater is responsible. Thus, in a system having a large number of RDF protected disk volumes, each updater 134 will utilize only a small fraction of the audit image records in the corresponding image trail 136, 138. For instance, in a system with four image trails (136, 138) and sixteen updaters (four per image trail), only about six percent of the audit records read by each updater (on average) will be relevant to that updater.

The receiver process 132 reads the master image trail 136, processing only the transaction commit/abort records in the master image trail. From the information in those records it builds a transaction status table (TST) 144 indicating the status of each transaction that has either committed or aborted.

Since the updaters 134 only initiate redo operations on the audit image records for transactions that have committed, the updaters 134 require the transaction status information in the transaction status table 144. To obtain that information, each updater 134 requests transaction status information from the receiver process 132 whenever it reads an audit image record for a database table that the updater is assigned to replicate and for which the transaction status is unknown to the updater.

The receiver process 132, in response to each status request, sends the requesting updater process 134 a message that includes not only the status of the transaction identified in the status request, but also the status of the next hundred or so transactions in the transaction status table that completed after the identified transaction. If the receiver process 132 does not yet know the status of the identified transaction, it does not respond to the status request until it receives a commit/abort record concerning the identified transaction.

When an updater process 134 reaches the end of file of the image trail 136,138 to which it is assigned, it performs a wait for a preselected amount of time, such as 2 to 10 seconds before attempting to reach more audit image records.

Monitor process 140 accepts user commands for controlling the RDF 120. Monitor process 140 also accepts user requests for status information and requests status information from the various processes in the RDF 120 in order to respond to those user requests.

Referring to FIG. 2, the extractor process 130 has a backup extractor process 150 and the receiver process 132 has a backup receiver process 152. The extractor backup process is created by the extractor process 130 and is always resident on a different CPU 160 from the extractor process 130 so as to improve the chances that a hardware failure of the extractor process's CPU will not affect the backup extractor process. Similarly, the receiver backup process 152 is created by the receiver process 132 and is always resident on a different CPU 162 from the receiver process 132.

The extractor backup process 152 is dormant while the primary extractor process 130 remains active. An operating system procedure 156 periodically checks on the primary extractor process 130 to determine if it is still alive. When the operating system determines that the primary extractor process 130 has failed, the extractor backup process 150 takes over execution of the extractor procedures at a takeover location specified by the last checkpoint performed by the primary extractor process 130 (as will be explained in more detail next) utilizing the last checkpointed information 158 from the primary extractor process to establish the backup extractor's process context.

A "checkpoint" operation is defined in this document to mean the storage of information by one process in a backup process. Thus, checkpoints store information in primary memory, not on durable disk or other secondary memory storage.

The extractor process 130 performs a checkpoint whenever (A) it finishes reading one MAT file and begins reading a next MAT file, (B) whenever the extractor receives acknowledgment from the receiver process 132 that a message buffer has been received, and (C) in a number of special context change circumstances not relevant here. When the extractor process 130 performs a checkpoint, the information 158 transferred by the primary extractor process 130 to its backup process includes:

a takeover location, the extractor's current position in the MAT file; and all data structures associated with processing audit records, including partially processed audit records, the last seen commit/abort timestamp, and so on.

The extractor process 130 does not durably store a context record, except as part of an orderly shutdown of the extractor process. This durably stored context record is used at startup to determine where the extractor process 130 should start reading in the MAT 104.

In the prior art Tandem RDF 120, the transferred takeover location can be any point in the extractor process's programming. In the prior art Tandem RDF 120, the receiver process 132 frequently performs checkpoint operations. More specifically, the receiver process 132 performs a checkpoint (A) upon receipt of a message buffer of audit information from the extractor process (before sending an acknowledgement reply message to the extractor process), (B) upon completion of a no-waited write to the image trail disk files (i.e., upon receipt of notification of successful writes to all the image trails from the associated disk processes), (C) whenever it fills up one set of image files and begins writing to a next set of image files, and (D) in a number of special context change circumstances not relevant here.

Whenever the receiver process 132 performs a checkpoint, the information 164 transferred by the primary receiver process 132 to its backup process 152 includes:

a takeover location, the receiver's current position in the image files (i.e., the current end of file position for each image file, which is also the position for the next write operation to each of the image files); and all data structures associated with processing audit records, including the complete message buffer received from the extractor process, partially processed blocks of data not yet written to image disk files, and an updater status table. The updater status table indicates the last reported image trail read position for each updater.

Immediately after the receiver 132 receives a message buffer of audit image records it performs a checkpoint, moving a copy of its context record and all the received data to its backup process. Then it sends an acknowledgment reply message back to the extractor process 130. Next, it writes a copy of the received audit image records into the master image trail 136 and into each auxiliary image trail 138. The master image trail 136 and each auxiliary image trail 138 are a series of disk files having sequentially assigned file names.

The receiver process 132 durably stores its context record every five minutes so as to durably store its current image trail file positions. This durably stored context record is used at startup to determine where the receiver process 132 should start writing data into the image trail files.

The entire context of the backup extractor process 150 is determined by the checkpoint information stored in its address space by the last checkpoint operation performed by the primary extractor process. When the backup extractor process starts up due to failure of the primary extractor process 130, the backup extractor process 150 does not perform any data structure initializations. Rather, it immediately starts execution at the takeover location provided by the last checkpoint and uses the checkpointed data structures as its own data structures.

In a similar manner, the entire context of the receiver process 152 is determined by the checkpoint information stored in its address space by the last checkpoint operation performed by the primary receiver process 132.

When the backup receiver process 152 starts up due to failure of the primary receiver process 132, the backup receiver process 152 does not perform any data structure initializations. Rather, it immediately starts execution at the takeover location provided by the last checkpoint and uses the checkpointed data structures as its own data structures.

This method of primary/backup failover used in the prior art Tandem RDF requires (A) that checkpoints transmit all information needed by the corresponding backup process to resume execution immediately, and (B) that checkpoints be performed not only at all significant context changes, but at all points where failure to perform a checkpoint could result in the extractor and receiver becoming desynchronized.

While the RDF system 120 described above has functioned well in commercial use for years, it has been determined, through long experience, that the failover mechanism has a number of shortcomings, and that operating requirements associated with the failover mechanism have greatly limited the throughput (i.e., the number of database updates handled per second) of the RDF system 120. In particular, a primary shortcoming of the prior art failover mechanism is that there remain circumstances, while rare, in which a backup process will not have the information needed, causing the extractor and receiver to become desynchronized.

Two databases, such as the primary database and backup database are said to be "synchronized" if they both have identical contents, in terms of data configured for replication on the backup database. Two databases are said to be "virtually synchronized" if in the course of its normal operation the RDF (i.e., all relevant audit records are being transmitted to the remote backup system) can make up for any difference between the two databases, as in the case of a time lag between data arriving in the MAT file and being transmitted by the RDF to the backup database. When the RDF catches up to the primary system, the two are once again fully synchronized.

In the prior art RDF system 120, there is no coordination between the extractor and receiver processes 130, 132 other than use of message sequence numbers in the message buffers transmitted from the extractor process 130 to the receiver process 132. The prior art RDF system simply assumes that virtual synchronization of the extractor and receiver processes is maintained at all times. Thus, the system does not provide an automatic system and method for the extractor and receiver to resynchronize in the event that desynchronization occurs. For instance, if receiver receives a message buffer with a wrong sequence number, the RDF system 120 would crash.

While such desynchronizations are rare, the mechanisms used by RDF system 120 to avoid desynchronization are complex, use a large percentage of the RDF's entire resources, and are not entirely failure proof.

In the prior art RDF system 120, the maximum number of image trails 136, 138 that the receiver can handle is seven. This limit is based on the receiver's checkpointing requirements, which absorb much of the receiver process's resources, and the I/O overhead associated with writing all audit information to the image trails.

Another shortcoming of the prior art RDF system 120 that limits the RDF system's throughput, is the requirement that the extractor process 130 wait until a message buffer is acknowledged by the receiver process 132 before the extractor process resumes processing more audit records. The RDF system 120 thus uses only one message buffer at a time. This requirement is based on the need to maintain virtual synchronization between the primary and backup systems. However, this "wait until reply" requirement greatly reduces the overall rate at which the extractor process 130 can process audit records.

Yet another shortcoming of the prior art RDF system 120, alluded to above, is that the updaters 134 (actually the disk processes called by the updaters) are inefficiently used in systems with large numbers of updaters (e.g., more than eight updaters) because only a small fraction of the records in the image trail processed by each updater will be relevant to that updater.

It is therefore a primary object of the present invention to provide an improved RDF failover mechanism that imposes significantly less overhead on the RDF system, while providing complete failover protection against all single process failures and all multiple process failures. It is thus an object of the present invention to ensure the integrity of the RDF for any type of failure.

A related object of the present invention is to provide an RDF system with tight synchronization between the extractor and receiver processes and procedures that guarantee, regardless of the cause or type of failure, that the two will resynchronize automatically.

Another related object of the present invention is to provide a primary process to backup process failover mechanism for the extractor and receiver processes that does not rely on frequent checkpointing, thereby avoiding the high overhead associated with such checkpointing and the inherent complexity of such checkpointing.

Another object of the present invention is to make the process of sending audit records from the extractor process to the receiver process more efficient.

Yet another object of the present invention is to make the receiver and updater processes more efficient by delivering to each image trail only the audit records needed by the processes utilizing those image trails.

SUMMARY OF THE INVENTION

In summary, the present invention is a distributed computer database system having a local computer system and a remote computer system. The local computer system has a local database stored on local memory media, application programs that modify the local database, and a transaction manager that stores audit records in a local audit trail reflecting those application program modifications to the local database as well as commit/abort records indicating which of the transactions making those database modifications committed and which aborted. Each audit record has an associated audit trail position in the local audit trail.

The remote computer system, remotely located from the local computer system, has a backup database stored on remote memory media associated with the remote computer system.

A remote data duplication facility (RDF) is partially located in the local computer system and partially in the remote computer for maintaining virtual synchronization of the backup database with the local database. The RDF includes an extractor process executed by said local computer system, and a receiver process and a plurality of updater processes executed by the remote computer system.

The extractor process extracts audit records from the local audit trail. It has a plurality of message buffers for buffering groups of the extracted audit records together and transmits each message buffer to said remote computer system when the buffer is full of a timeout occurs. Each transmitted message buffer has an associated sequence number. The sequence numbers for sequentially transmitted message buffers follow a predefined sequence. The extractor process continues, after transmitting a any message buffer to the remote computer system, to buffer groups of extracted audit records in other ones of the message buffers and to transmit those message buffers to the remote computer system.

The receiver process stores an expected next message sequence number and a context record denoting a restart audit trail position value. The receiver process receives message buffers transmitted by the extractor process. It compares the message sequence number associated with each received message buffer with its locally stored expected next sequence number. If the two do not match, the receiver process transmits an error message to the extractor process. If the two do match, the receiver process responds by sending a reply message to the extractor process acknowledging receipt of the message buffer, updating the expected next message sequence number in accordance with the predefined sequence. It then distributes the audit records in the received message buffer to a plurality of image trail files in the remote computer system and updates the restart audit trail position value based on the audit trail positions associated with said audit records in said received message buffer.

Each updater process, executed by the remote computer system, reads the audit records in an assigned one of said image trail files and initiates redo operations of database modifications denoted in at least a subset of the read audit records against the backup database.

The extractor process responds to each reply message acknowledging receipt of a message buffer by enabling reuse of that message buffer, responds to each error message by determining the restart audit trail position value stored by the receiver process and then extracting audit records from the local audit trail starting at that restart audit trail position value.

BRIEF DESCRIPTION OF THE DRAWINGS

Additional objects and features of the invention will be more readily apparent from the following detailed description and appended claims when taken in conjunction with the drawings, in which:

FIG. 7A is a block diagram of a context record for the receiver process in a preferred embodiment of the present invention. FIGS. 7B-7D are block diagrams of data structures used by the receiver process in a preferred embodiment of the present invention.

DESCRIPTION OF THE PREFERRED EMBODIMENTS

Figure 3:
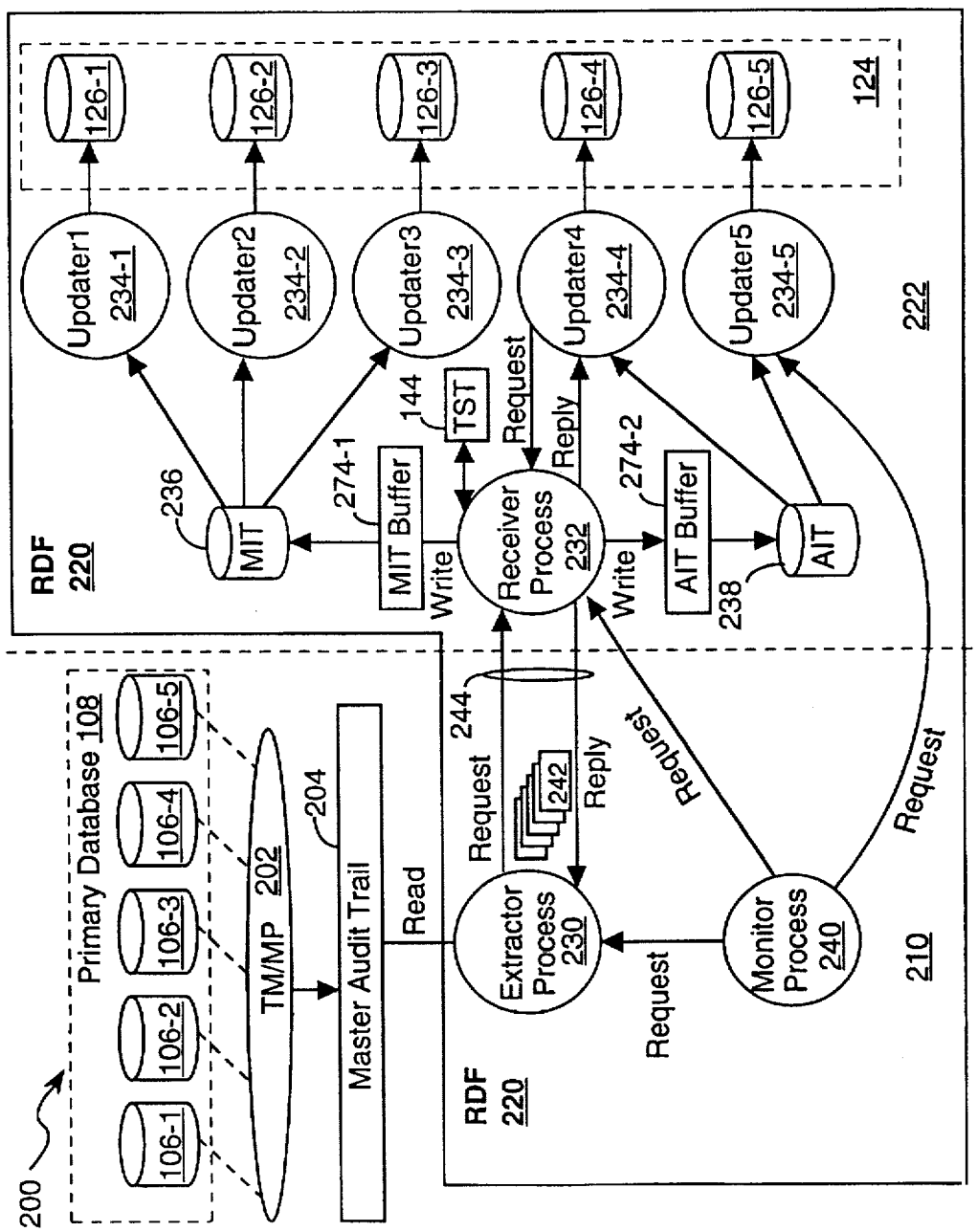
FIG. 3 is a block diagram of a database management system with a remote duplicate database facility in accordance with the present invention.
Figure 4:
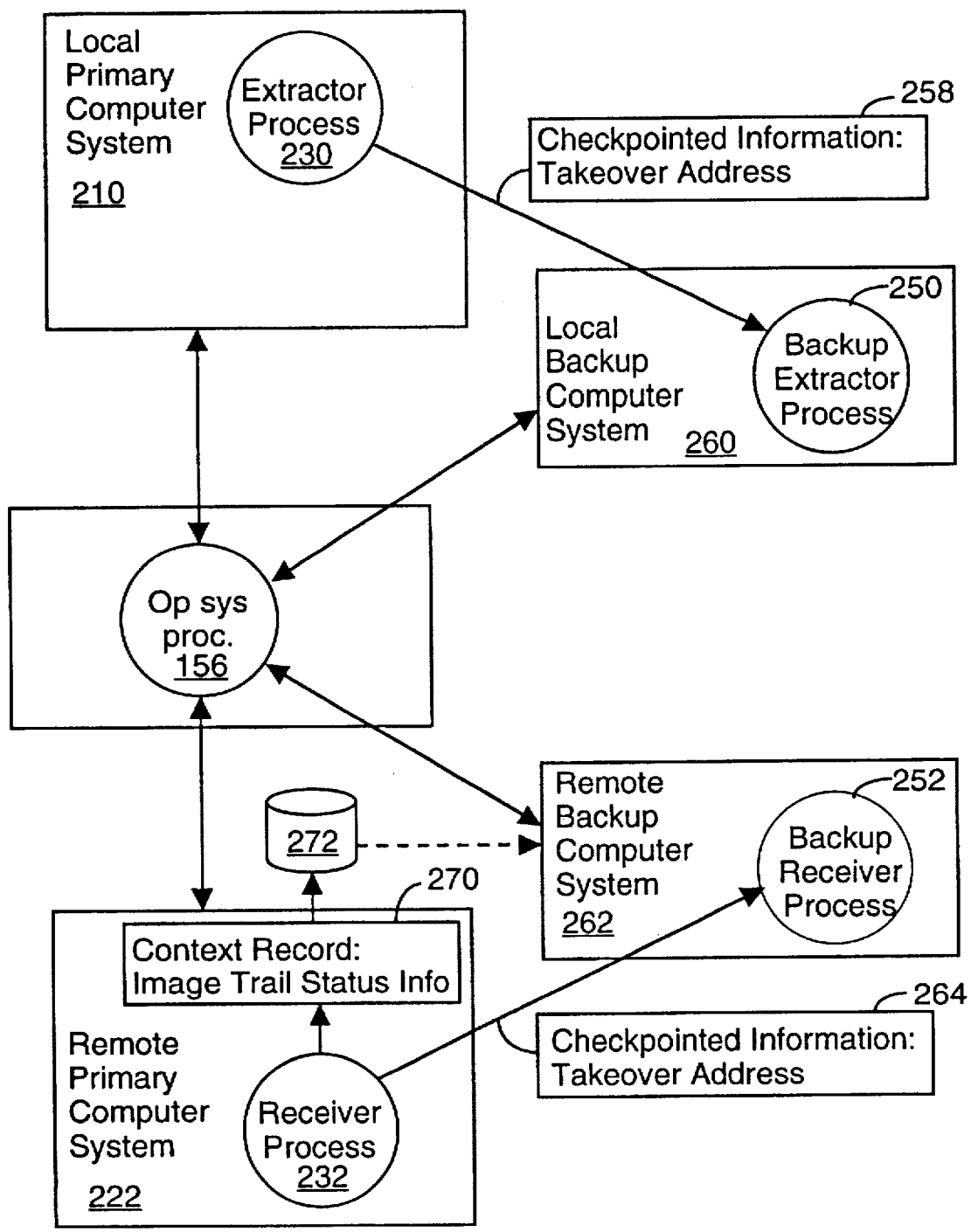
FIG. 4 is a conceptual representation of the checkpoint, context save, and failover procedures used by the system shown in FIG. 3.

FIGS. 3 and 4 represent the basic architecture of a computer system 200 utilizing the remote duplicate database facility (RDF) 220 of the present invention. Operation of the present invention will be explained by first giving an overview of how the present invention differs from the prior art Tandem RDF system discussed in the background section of this document. The overview is then followed by a detailed explanation of the extractor, receiver and updater processes of the present invention, and their failover procedures.

Overview of Improved RDF System

Figure 1:
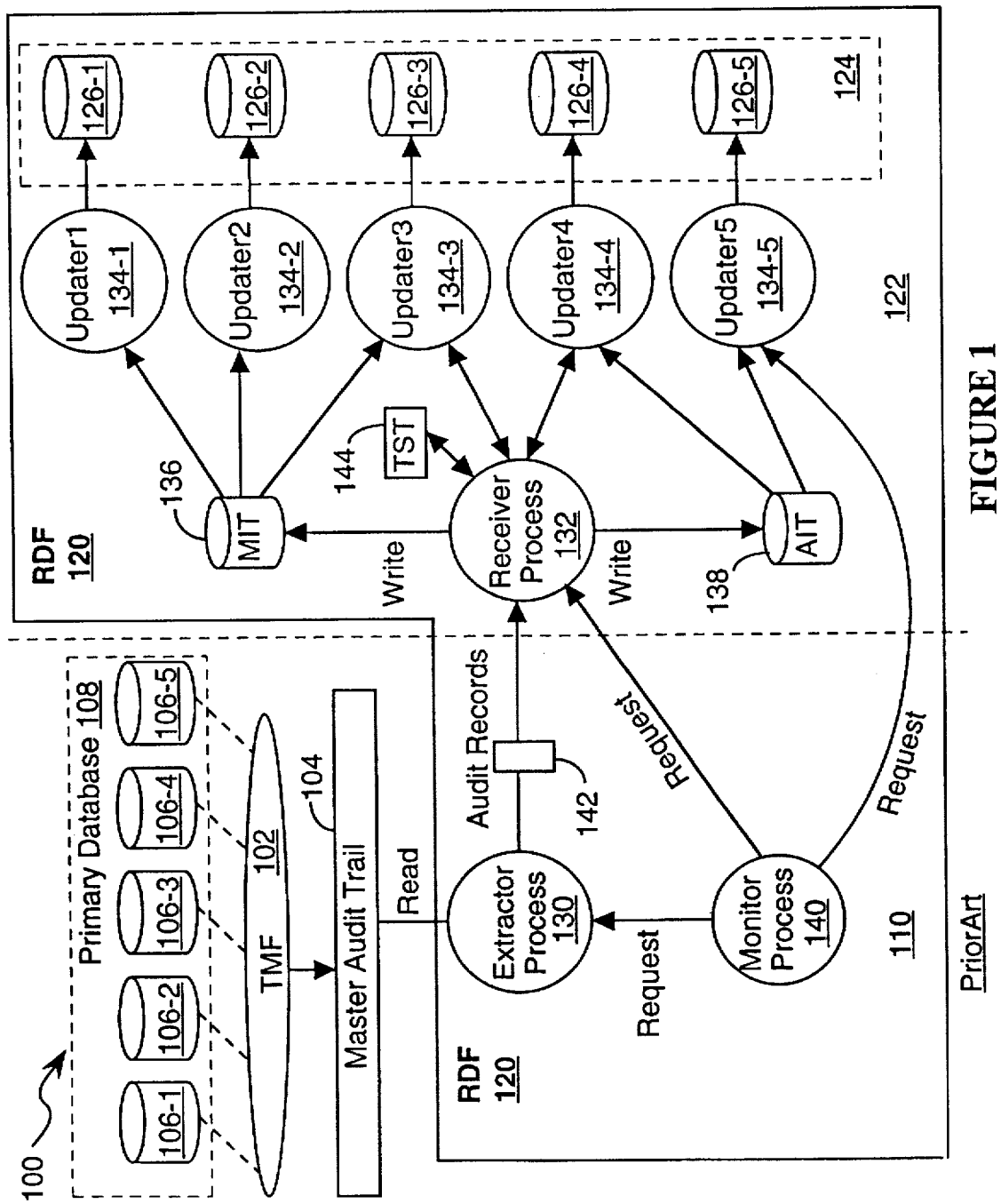
FIG. 1 is a block diagram of a prior art database management system with a remote duplicate database facility.
Figure 2:
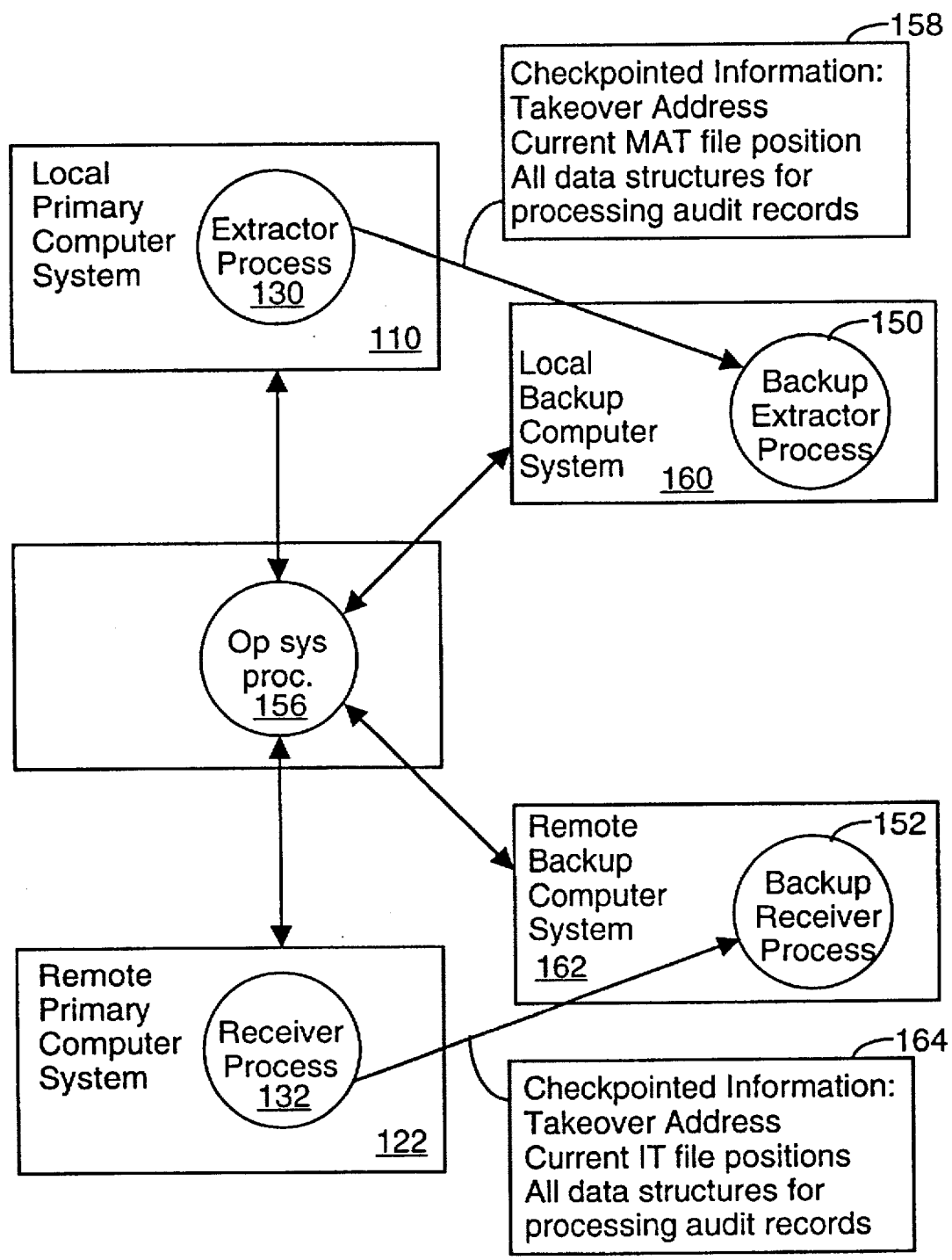
FIG. 2 is a conceptual representation of the checkpoint and failover procedures used by the system shown in FIG. 1.

The extractor-receiver-updater architecture of the RDF system 220 (shown in FIG. 3) has many similarities to the RDF system 120 of FIGS. 1 and 2. Furthermore, the operation of the transaction management/massively parallel system (TM/MP) 202 is similar to that of the TMF 102, although most of the changes are not directly relevant to the present invention, with the exception of a new type of audit record stored in the MAT 204 when an "online DDL" operation is performed.

The extractor process 230 of the present invention differs from the prior art version as follows. First, the extractor process 230 of the present invention does not perform frequent checkpoint operations. In fact, the extractor process performs only a single checkpoint operation during startup of the extractor process, and that checkpoint 258 only sends a takeover location to the backup extractor process 250. (See FIG. 4.) After that, the extractor process 230 performs no further checkpoints. It also does not durably store a context record. Rather, the extractor process 230 has been revised so that the extractor relies on information received from the receiver process 232 when recovering from a failover, as will be explained in more detail below, as well as during an RDF startup.

The second most significant change to the extractor process is that it now uses a plurality of message buffers 242. The extractor process 230 now uses two to eight message buffers 242, with four message buffers being a typical configuration. After filling and transmitting a message buffer 242 to the receiver process via a communication channel 244, the extractor process 230 does not wait for an acknowledgement reply message from the receiver process 232. Rather, as long another message buffer is available, it continues processing audit records in the MAT 204, storing audit image records in the next available message buffer 242. Each message buffer 242 is made unavailable after it is transmitted to the receiver process 232 until a corresponding acknowledgement reply message is received from the receiver process 232, at which point the message buffer 242 becomes available for use by the extractor process 230.

These two changes (i.e., almost complete elimination of checkpointing and use of multiple message buffers) to the extractor process 230 greatly increase its efficiency, the first by almost eliminating resource usage for failover protection, and the second by allowing the extractor process 230 to continue processing audit records in the MAT 204 while waiting for the receiver process to acknowledge receipt of previously sent audit records.

The receiver process 232 of the present invention differs from the prior art version as follows. First, the receiver process 232 of the present invention does not perform frequent checkpoint operations. In fact, the receiver process performs only a single checkpoint operation during startup of the receiver process, and that checkpoint 264 only sends a takeover location to the backup receiver process 252. (See FIG. 4.) After that, the receiver process 232 performs no further checkpoints. However, it does periodically (e.g., once every 5 to 25 seconds) durably store a context record 270 on a nonvolatile (disk) storage device 272. The context record 270 stored by the receiver process 232 is quite small, consisting primarily of two location values per auxiliary image trail 238 and three location values for the master image trail 236.

Compared with the checkpointing performed by the above described prior art receiver process 232, which was typically performed multiple times per second during normal usage and involved the storage of large quantities of information (up to 30 Kbytes of data), the periodic context record save operations by the receiver process 232 in the present invention use significantly less resources.

The second significant change to the receiver process is that the receiver process immediately acknowledges each received message buffer. No processing of the message buffer is performed before the acknowledgement is sent. The elimination of message buffer checkpointing by the receiver, and the use of multiple message buffers by the extractor, makes both the receiver and extractor more efficient because idle time in both processes is greatly reduced. Throughput of records from extractor to receiver has improved by approximately a factor of ten (from approximately 110K bytes/sec to approximately 1300K bytes/sec).

A third significant change to the receiver process is that it now sorts received audit records such that (A) commit/abort records are stored only in the master audit trail 236, and (B) each database update audit record is moved into only the one audit trail 236, 238 corresponding to the only updater process 234 which will potentially use that audit record to update data stored on a backup volume 126. Furthermore, there is no limit on the number of image trails used, while there was a limit of seven image trails in the prior art RDF system due to checkpointing limitations. These changes significantly reduce the I/O burden on the receiver process 232. In a system with N audit trails 236, 238, the number of audit records written to disk files is reduced by a factor of N in comparison with the prior art receiver process. This change also makes the updater processes 234 much more efficient than the prior art updater processes 134 because the number of audit records read (by their corresponding disk processes) is also reduced on average by a factor of N.

A fourth significant change to the receiver process is that the receiver process now includes a separate buffer 274 for each image trail. In the preferred embodiment, each image trail buffer is 32K bytes long. Each image trail buffer 274 is structured as seven blocks of length 4K bytes, plus an overflow area and each image trail buffer is considered to be full when the first 28K bytes of the buffer have been filled with audit records.

A fifth change to the receiver process is that whenever it receives a special "Stop Updaters" audit record, it copies that record into all the audit trails. The Stop Updaters audit record, produced on the primary system 210 by special "online DDL" procedures, causes all the Updaters 234 to stop and prompts the operator of the RDF to (A) perform the same DDL procedure on the remote backup system as was performed by the online DDL procedure and then (B) to re-start the updaters. This last change to the receiver process affects neither the failover effectiveness of the RDF system nor the computational efficiency of the receiver process 232. Rather, it is a procedure used to ensure continued virtual synchronization of the local and remote database when "online DDL" procedures are used to restructure database objects with minimal interruption of user access to the database objects being restructured.

Unlike the prior art RDF system, which had virtually no synchronization of extractor and receiver precesses, the present invention provides tight synchronization of the extractor and receiver processes and provides for automatic resynchronization whenever either process is started or has a failover, and whenever the receiver process receives audit records out of order from the extractor process.

A change to the updater processes is that they now read a master image trail position value embedded periodically in "header" records in the their respective image trail files. Whenever the updater process sends a request to the receiver process, it reports to the receiver process the saved MIT position and the saved image trail file position in the updater's last durably stored context record.

The first reported value is used by the receiver process 232 to determine where in the master image trail 236 to start when reconstructing the transaction status table 144, and also to determine which portions of the transaction status table 144 are no longer needed and thus can be discarded. The reported MIT position is also used to determine which MIT files can be discarded. The second reported value is used by the receiver process 232 to determine which image trail files have been processed by all the updaters assigned thereto and thus can be deleted (as was also the case in the prior art RDF system 120).

DETAILED EXPLANATION OF EXTRACTOR PROCESS

Figure 5A:
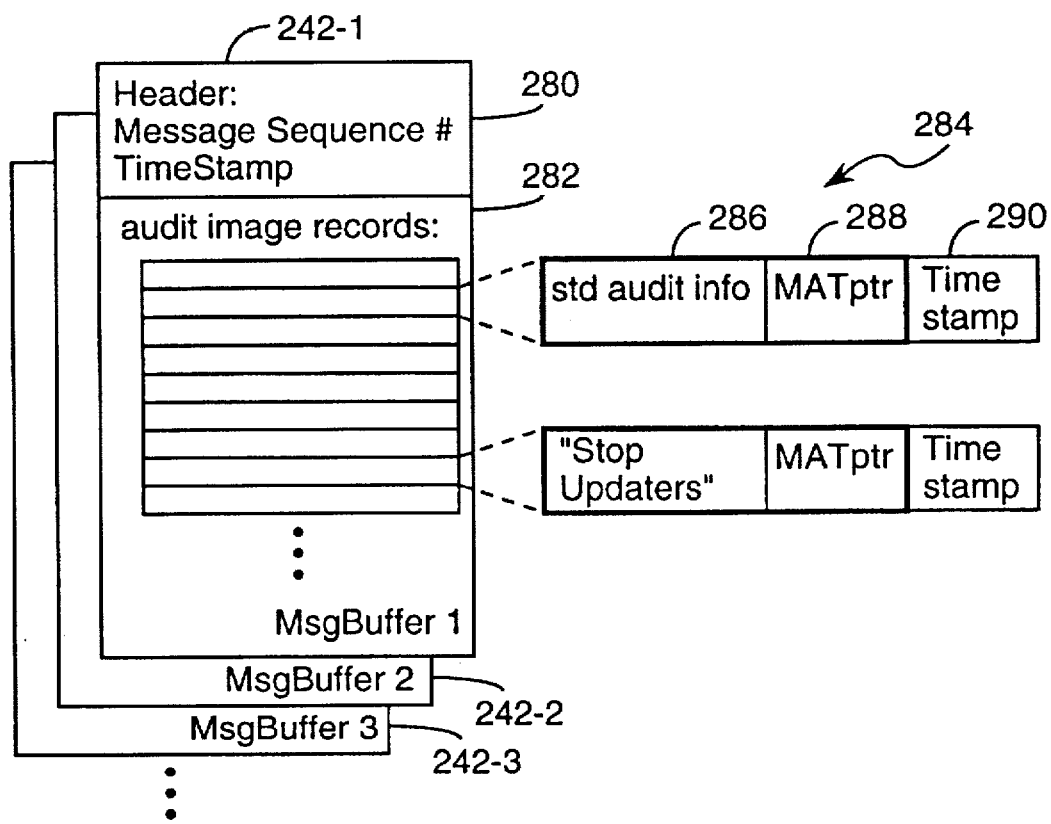
FIGS. 5A and 5B depict data structures used by the extractor process in a preferred embodiment of the present invention.
Figure 5B:
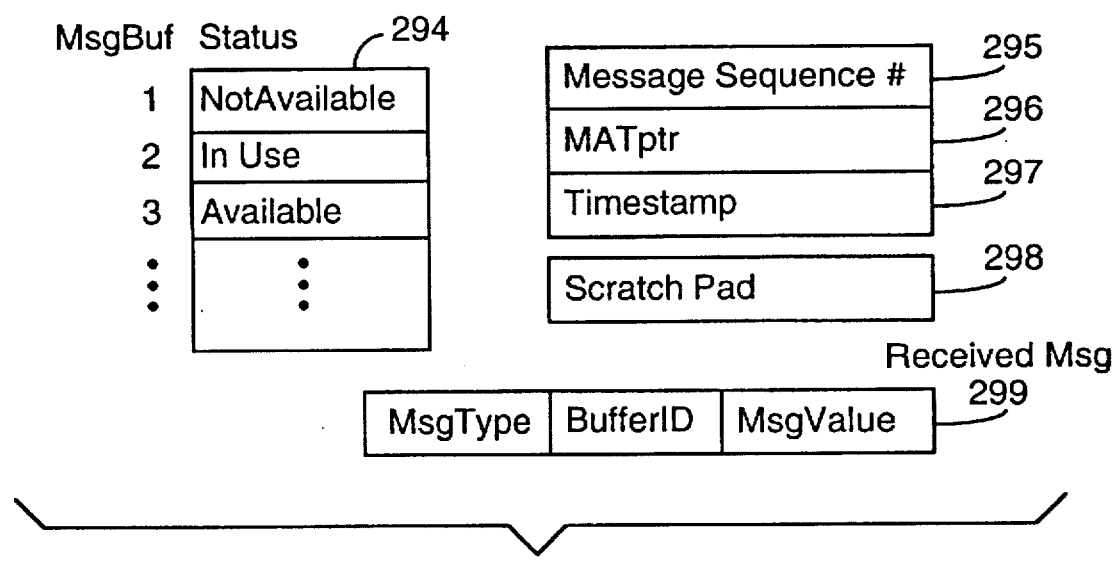

Referring to FIGS. 5A and 5B, the primary data structures used by the extractor process 230 are as follows. As stated earlier, the extractor process 230 utilizes two or more message buffers 242. A portion of each message buffer 242 is used to store a "header" 280, which includes (A) a message sequence number and (B) a timestamp. The body 282 of the message buffer 242 is used to store audit image records 284. Each image record 284 includes an audit information portion 286, a MAT position value 288 and a timestamp value 290. The audit information portion 286 and the field occupied by the MAT value 288 are copied from an audit record in the MAT 204, while the timestamp field 290 is appended by the extractor process to create an "audit image record" 284.

The audit information portion 286 consists of the standard information found in audit records in the MAT 204, such as before and after field values for a modified row in a database table, or a commit/abort indication for a completed transaction. In accordance with the present invention, a new audit image record is defined in which the audit information portion 286 contains a "Stop Updaters" value, indicating that each updater process 234 should be stopped when it reads that audit record.

The extractor process 230 also maintains a message buffer status table 294, which indicates for each message buffer whether that buffer is available for use, not available for use, or is currently in use by the extractor. In addition, the extractor process 230 maintains a message sequence number in register 295, a MAT file pointer in register 296, a local timestamp value in register 297, and a scratch pad 298 in which it stores audit image records that it is currently processing.

Finally, the extractor process 230 includes a data structure 299 for storing reply messages received from the receiver process 232. This data structure includes a first field indicating the type of message received, which is equal to either "message buffer acknowledgement" or "resynch reply", a message buffer identifier, and a "message value" field. The message value field is equal to a MAT position value when the message type is "resynch reply," and is equal to either an "OK" or "Error" condition code when the message type is "message buffer acknowledgement."

Appendix 1 lists a pseudocode representation of the procedures executed by the extractor process 230. Appendix 2 lists a pseudocode representation of the procedures executed by the receiver process 232. Appendix 3 lists a pseudocode representation of the procedures executed by the updater processes 234. The pseudocode used in Appendices 1-3 is, essentially, a computer language using universal computer language conventions. While the pseudocode employed here has been invented solely for the purposes of this description, it is designed to be easily understandable by any computer programmer skilled in the art.

Referring to FIGS. 6A-6E, and the pseudocode in Appendix 1, the extractor process 230 works as follows.

The Extractor Startup Procedure 300 is called whenever the extractor process 230 or its backup starts up, as in the case of a failover or a transfer of control back to the primary extractor process 230 from the backup extractor process. The Startup procedure begins by creating a backup process (302). The startup procedure then performs a "static initialization" of the extractor process (304), which means that all static data structures used by the extractor process are allocated and initialized. While initializing static data structures, the extractor process reads information denoting the set of RDF protected objects from a disk file having a predefined filename and disk location, and builds an internal table of RDF protected disk volumes. This table is used later as a audit record filter, such that object update audit records for non-RDF protected volumes are ignored by the extractor process. Then a checkpoint operation is performed in which a takeover location is transmitted to the backup extractor process (306). The takeover location is, in essence a program address, and in the preferred embodiment the takeover location is the program location at which execution of the volatile initialization procedure 310 begins. Finally, the Extractor Startup procedure calls (308) the Extractor Volatile Initialization procedure 310.

The Extractor Volatile Initialization procedure 310 is called during startup by the Extractor Startup procedure 300 and when the extractor receives an Error reply message in response to a message buffer. The Extractor Volatile Initialization procedure begins by allocating and initializing all volatile data structures used by the Extractor process, including message buffers 242, the message buffer status array 295 (312), and the message sequence number (which gets initialized to an initial value such as 1. Then the Extractor Volatile Initialization procedure transmits a Resynchronization Request message to the receiver process (314) and waits for a Resynch Reply message (316). The Resynch Reply message will contain a MAT position value, which the Extractor Volatile Initialization procedure moves (318) into the MAT position pointer MATptr 296. Finally, the Extractor Volatile Initialization procedure calls (320) the main Extractor procedure 330.

The Main Extractor procedure 330 begins by initializing and starting a timer called the Message Timer (MsgTimer) (332). The Message Timer is typically programmed to expire in 1 or 2 seconds, although the timeout period is configurable to virtually any value. Next, the extractor procedure reads a record in the MAT (334). If the MAT record is an audit record for an RDF protected object, is a commit/abort record for any transaction, or is a "Stop Updaters" record, the audit record is modified by inserting the MAT position of the current audit record into the audit record and by appending to the audit record a timestamp (336). The appended timestamp is the timestamp of the last transaction to complete prior to generation of the audit record in the MAT 204. Every time the extractor procedure encounters a commit or abort audit record, it moves a copy of the timestamp in that record into its local timestamp register 297. The value in the local timestamp register 297 is the timestamp that is appended to audit records so as to generate an audit image record, also known as an image record.

If the message buffer currently in use has room for the resulting audit image record (338) it is moved into the message buffer (340). Then the Extractor procedure continues processing the next record in the MAT at step 334.

If the message buffer currently in use is full (338), the values stored in the message sequence number register 295 and the timestamp register 297 are inserted into the Message Buffer's header 280 (342). The extractor procedure then transmits the message buffer to the receiver process (344). After transmitting the message buffer, the Message Buffer Status array 294 is updated to indicate that the message buffer just transmitted is not available for use. In addition, the Message Timer is cleared and restarted, and the Message Sequence Number in register 295 is increased by one (346). Finally, the audit image record which did not fit in the last message buffer is moved into a next message buffer (348). If a next message buffer is not available, the extractor procedure waits until one becomes available and then moves the audit image record into it. Then the Extractor procedure continues processing the next record in the MAT at step 334.

When the audit record read (334) from the MAT 204 is not an audit record for an RDF protected table, is not a transaction commit/abort record and is not a "Stop Updaters" record, the audit record is ignored and the next audit record (if any) in the MAT is read (334).

Figure 6A:
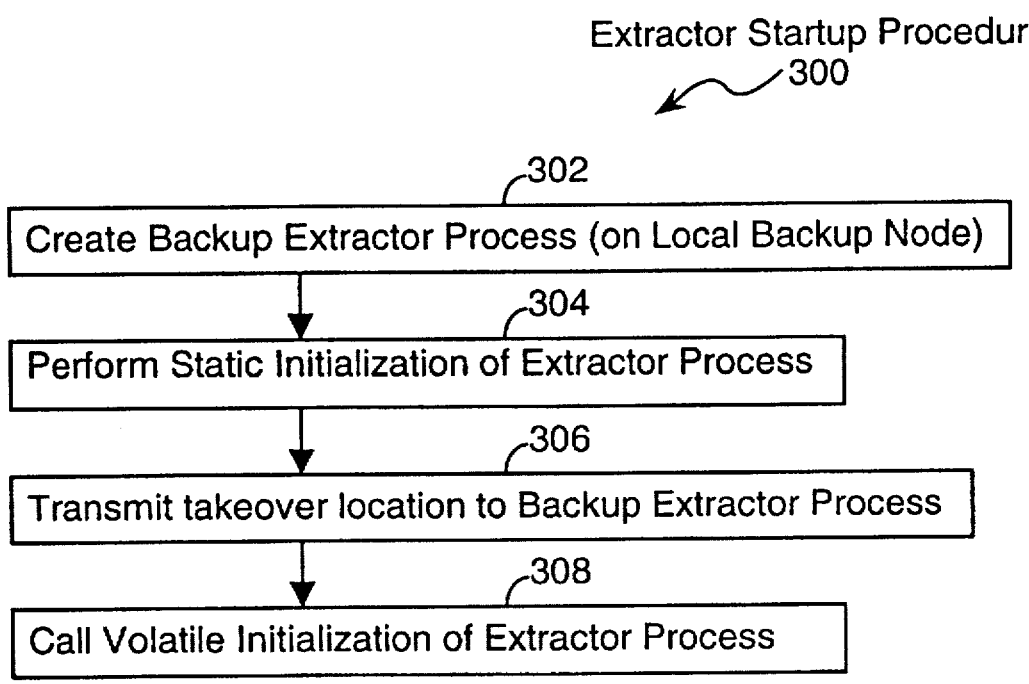
FIGS. 6A-6E are flowcharts of procedures executed by the extractor process in a preferred embodiment of the present invention.
Figure 6B:
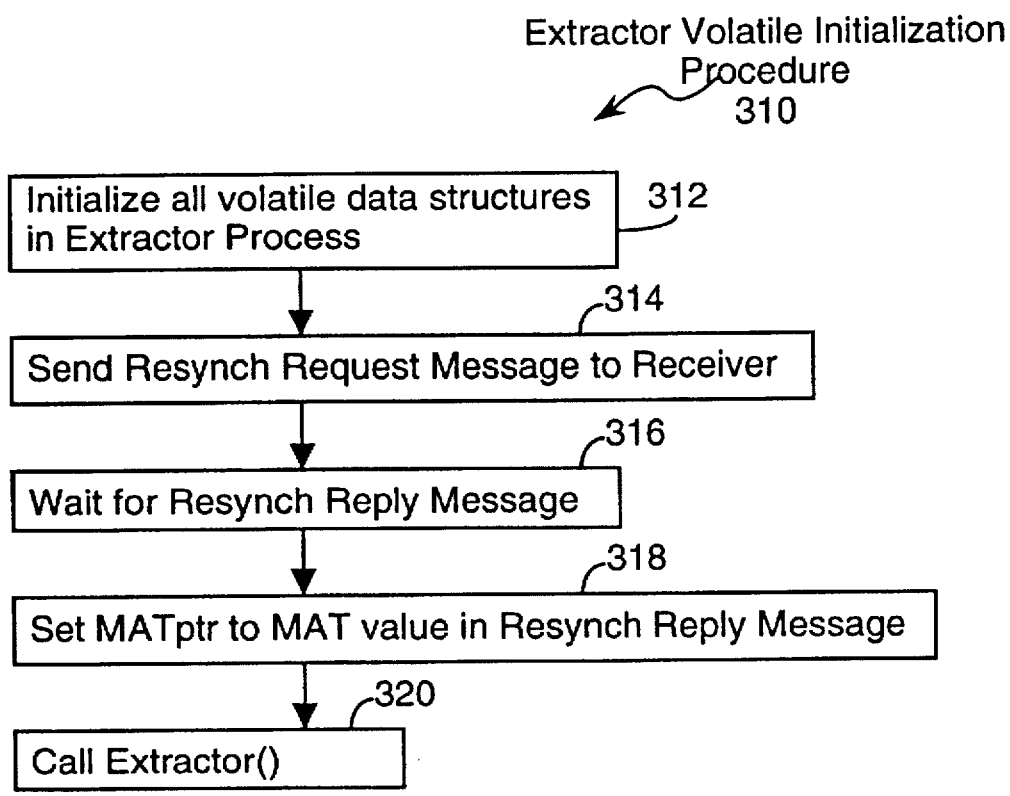
Figure 6C:
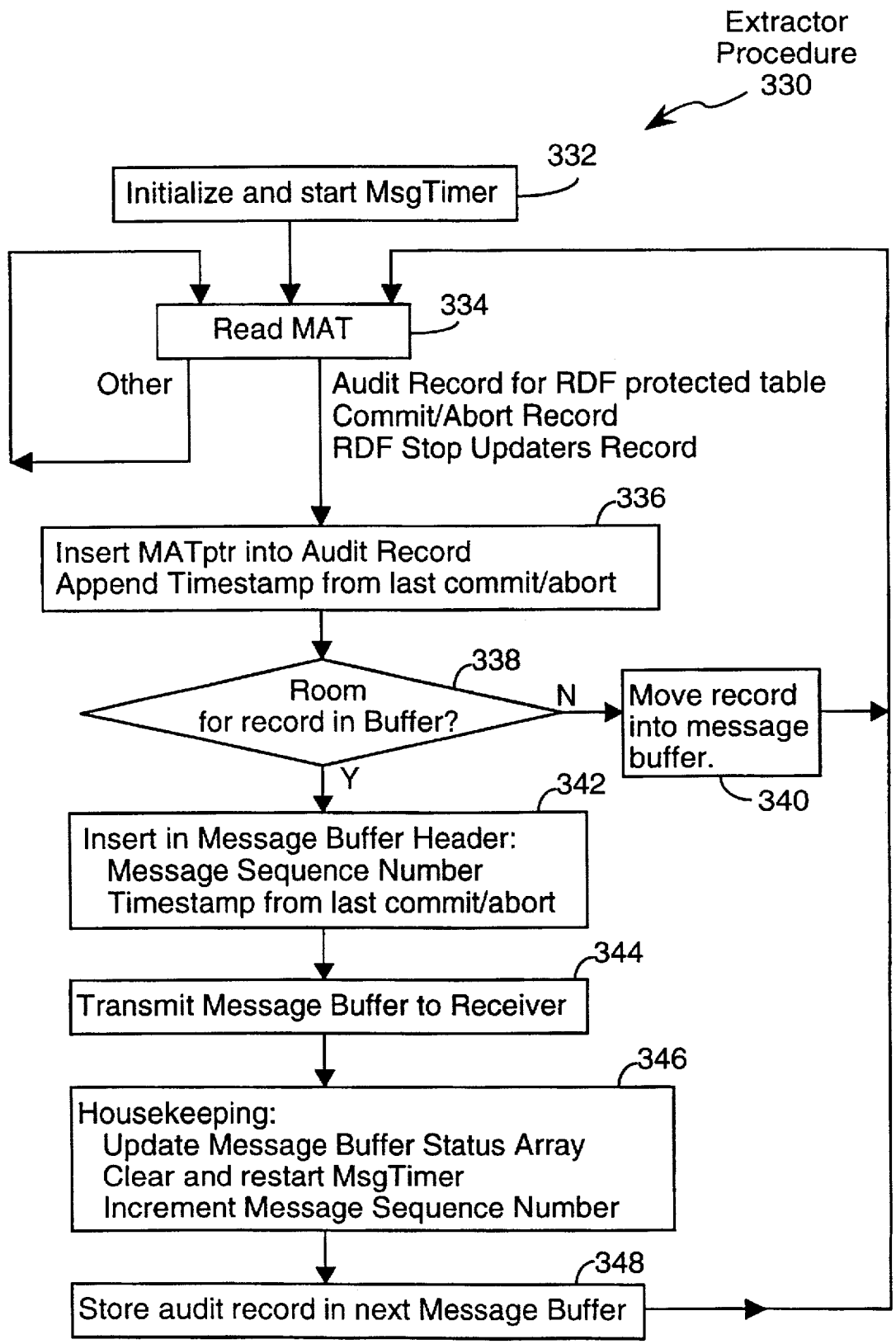
Figure 6D:
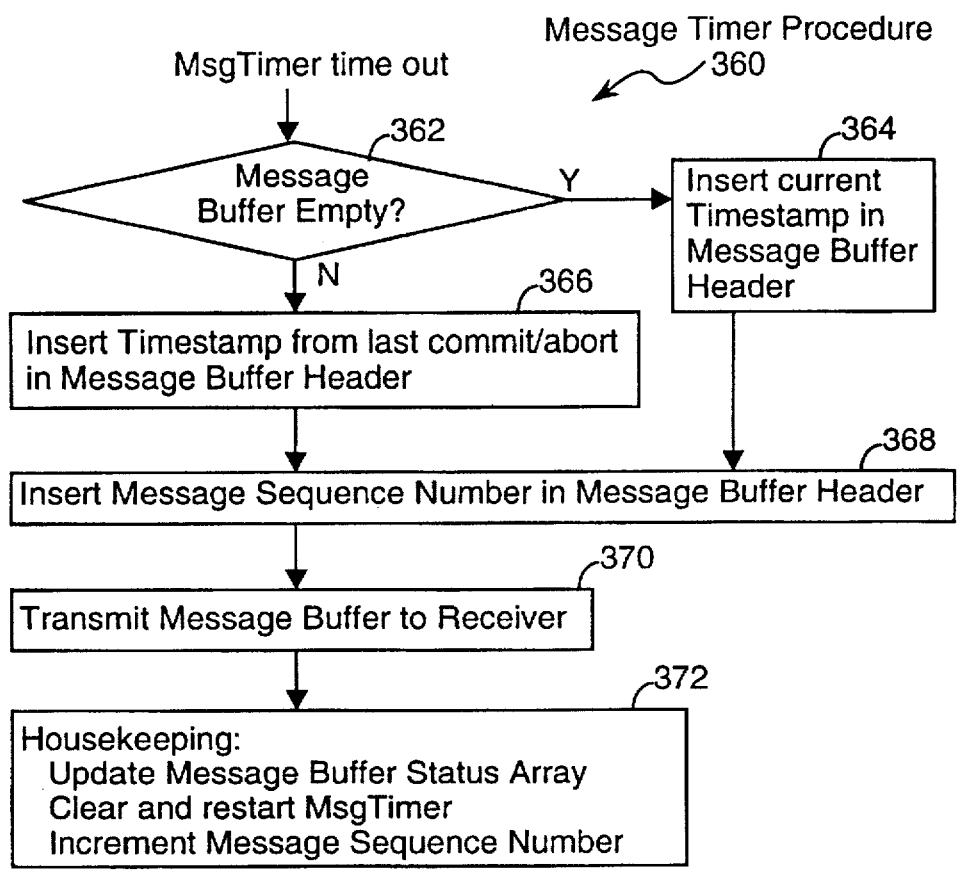
Figure 6E:
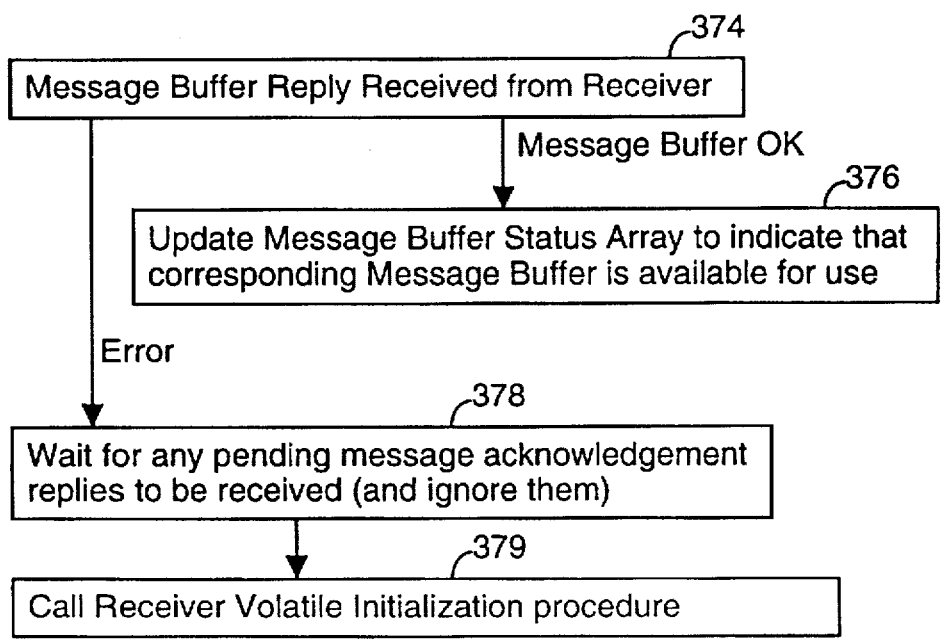

The purpose of the Message Timer is to ensure that audit image records are transmitted to the receiver process in a timely fashion, even when the rate at which audit records are generated for RDF protected files is low. Referring to FIG. 6D, when the Message Timer times out the Message Timer procedure 360 first checks to see if the current Message Buffer is empty (i.e., contains no audit image records) (362). If so, a current timestamp indicative of the current time is inserted into the Message Buffer header 280 (364). If not, the timestamp value from the last commit/abort record, stored in timestamp register 297, is inserted into the Message Buffer header (366). Then the current Message Sequence Number is inserted in the Message Buffer header (368) and the Message Buffer is transmitted to the receiver (370). After transmitting the message buffer, the Message Buffer Status Array 294 is updated to indicate that the message buffer just transmitted in not available for use, the Message Timer is cleared and restarted, and the Message Sequence Number in register 295 is increased by one (372).

When the extractor process receives a reply from the receiver process acknowledging receipt of a message buffer (374), if the reply message indicates the message buffer was received without error, the Message Buffer Status Array 294 is updated to indicate that the message buffer identified in the reply message in available for use (376).

If the reply message received by the extractor process from the receiver process has a message value indicating an error condition, the receiver process is requesting that the extractor and receiver resynchronize. The receiver process sends an error condition reply message whenever (A) a message with an out-of-sequence Message Sequence Number is received, and (B) whenever the receiver process starts up after a failover or return of control back to the primary receiver process from the backup receiver process (sometimes called a CheckSwitch). When the extractor process receives an error condition reply message from the receiver process, it waits for any pending message acknowledgment replies to be received for any other message buffers transmitted prior to receipt of the error condition reply message, and it ignores those reply messages (378). Then the extractor process calls the Extractor Volatile Initialization procedure (379) so as to resynchronize the extractor process with the receiver process.

DETAILED DESCRIPTION OF RECEIVER PROCESS

Figures 7A, 7B:
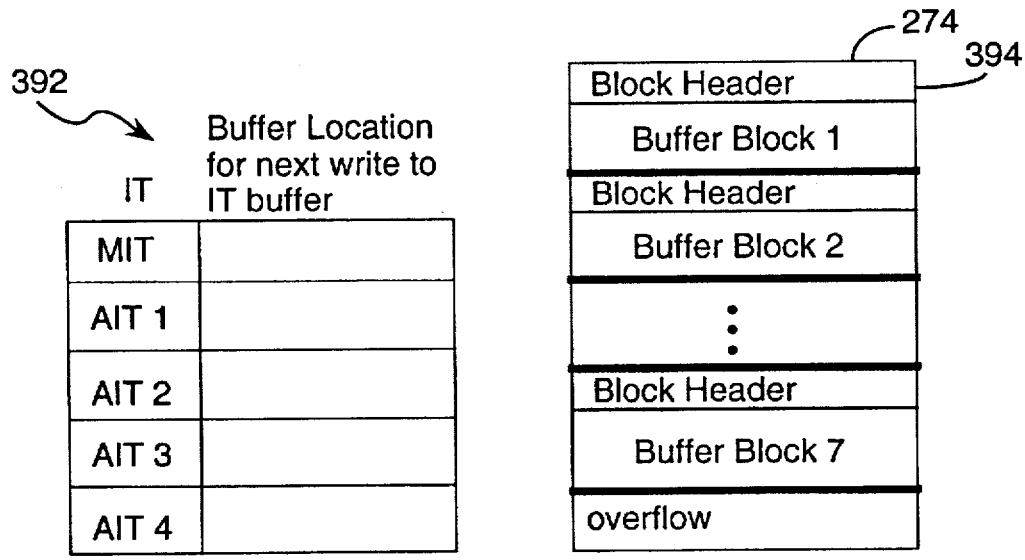

The primary data structures used by the receiver process 232 in the preferred embodiment are shown in FIGS. 7A–7D. As stated earlier, the receiver process durably stores a context record 270 on a nonvolatile (disk) storage device 272 on a periodic basis (e.g., once every 5 to 25 seconds). As shown in FIG. 7A the context record includes two location values per auxiliary image trail 238, three location values for the master image trail 236 (including a TST/MIT restart position 390), and a Receiver.StopUpdatersCnt count value 391.

As explained earlier, every audit record shipped to the receiver process 232 has a MAT position value inserted in it by the extractor process. When the receiver process moves audit image records into the image trail buffer 274 for an image trail, the MAT position of the last such record is stored in the appropriate slot of the context record 270.

Furthermore, each image trail buffer 274 is written to the corresponding disk file only (A) when the image trail buffer 274 is full (i.e., contains 28K of data) or (B) when the receiver process performs a periodic flush operation. Each time data from any image trail buffer 274 is written to disk, the disk file location for the next write to the image trail file (i.e., the disk address for the current end of the image trail file) is stored in the appropriate slot of the context record 270.

The restart MIT position 390 in the context record is derived from the updater status table 400, as will be described below. Basically, the restart MIT position is a position in the Master Image Trail at which the receiver process 232 should start processing audit records for rebuilding the transaction status table 144.

The Receiver.StopUpdatersCnt 391 is a count value that is incremented each time the receiver encounters a StopUpdaters record in a received message buffer whose MAT value is higher than the MAT position for at least one image trail.

The image trail buffer status array 392 stores one pointer value for each image trail buffer 274. That pointer value is the buffer location for the next audit record to be written to the image trail buffer, and is updated every time an audit record is written to the image trail buffer to point to the next available position for an audit record in that buffer. Whenever the buffer pointer value reaches a 4K byte boundary, certain information (described below) is written into the next block header 394 in the image trail buffer 274.

The receiver process also stores a "Next Message Sequence Number" 396, a "restart MAT position" 398, and an "ExpectStopUpdate" flag 399. The Next Message Sequence Number 396 is the message sequence number the receiver expects to see in the next message buffer receiver and is normally incremented by one after each message buffer is received. The restart MAT position 398 is the lowest of the MAT position values stored in the context record 270. The ExpectStopUpdate flag 399 is a flag set in response to a special "Expect Stop Update" message from the Monitor process just prior to a StopUpdaters audit record being moved by the extractor process into its current message buffer.

Referring to FIG. 7C, the updater status table 400 maintained by the receiver process stores the following information for each updater process: a value 402 that identifies the associated image trail, the StopPoint location 404 currently assigned to the updater, the last MIT position 406 reported by the updater process to the receiver process, and the last image trail file position 408 reported by the updater process to the receiver process. The meaning of these fields will be explained below.

Referring to FIG. 7D, the transaction status table 144 maintained by the receiver process includes for each commit/abort record processed in the master image trail 236 a transaction ID 410, a status value 412 (i.e., commit or abort), and the MIT position of the commit/abort record. The receiver also maintains a MIT position value 414 representing the last record in the MIT processed by the receiver process for purposes of updating the transaction status table 144.

Referring to FIGS. 8A–8G, and the pseudocode in Appendix 2, the receiver process 232 works as follows.

Figure 8A:
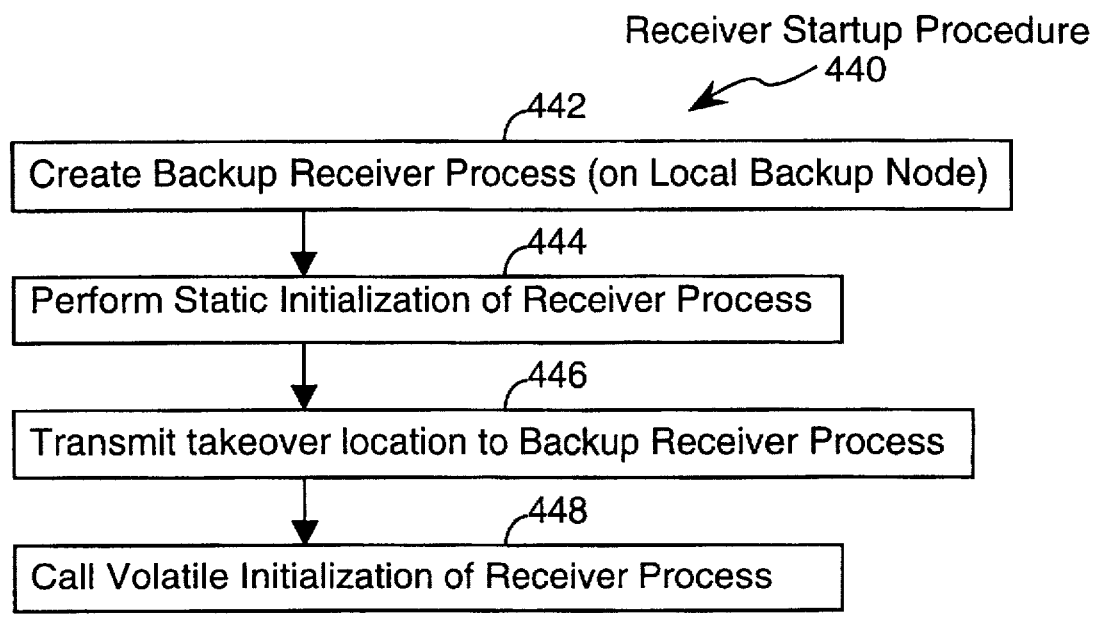
FIGS. 8A-8G flowcharts of procedures executed by the receiver process in a preferred embodiment of the present invention.

Referring to FIG. 8A, the Receiver Startup Procedure 440 is called whenever the receiver process 232 or its backup is started, as in the case of a failover or a transfer of control back to the primary receiver process 232 from the backup receiver process. The Startup procedure begins by creating a backup process (442). The startup procedure then performs a "static initialization" of the receiver process (444), which means that all static data structures used by the receiver process are allocated and initialized. Then a checkpoint operation is performed in which a takeover location is transmitted to the backup receiver process (446). The takeover location is, in essence a program address, and in the preferred embodiment the takeover location is the program location at which execution of the Receiver volatile initialization procedure 450 begins. Finally, the Receiver Startup procedure calls (448) the Receiver Volatile Initialization procedure 450.

Figure 8B:
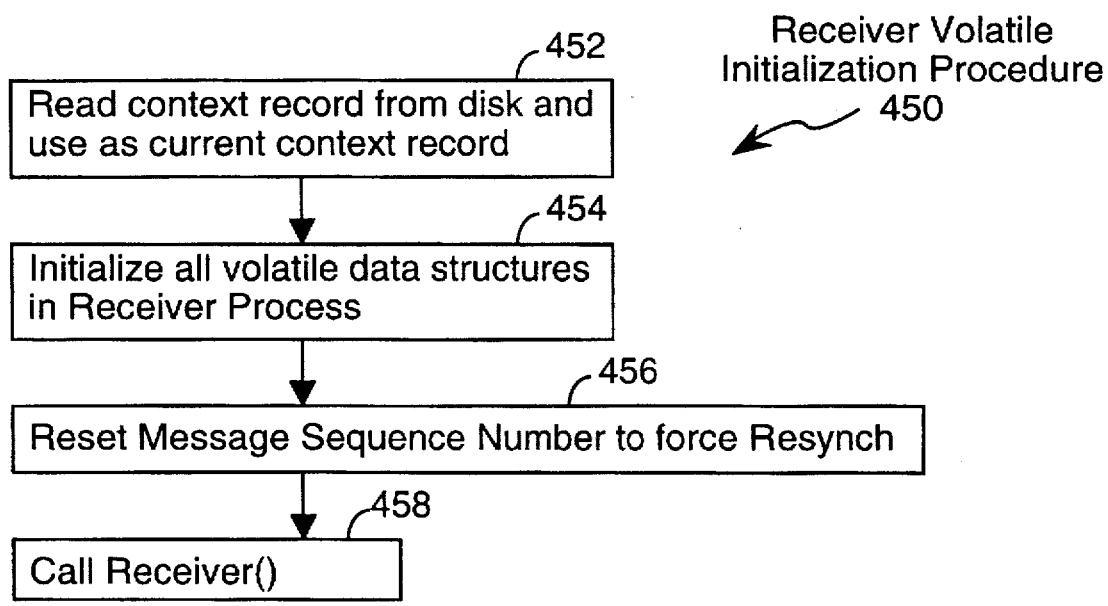
Figure 8C:
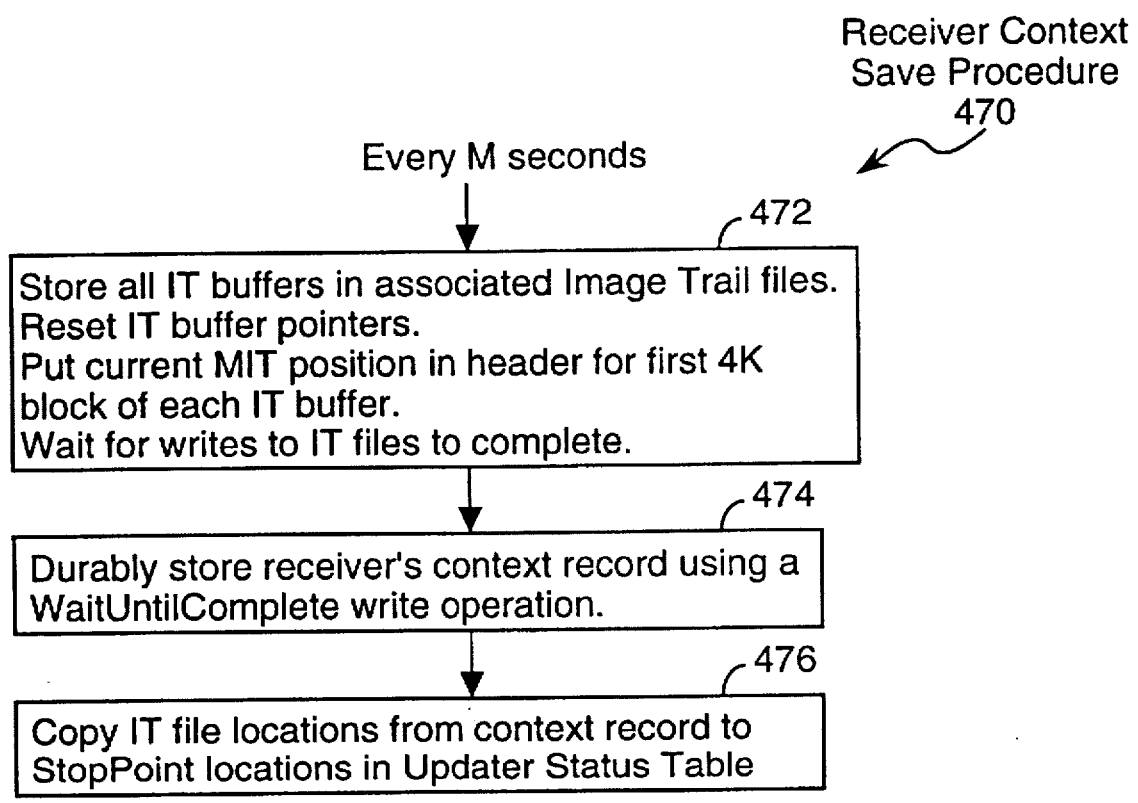
Figure 8D:
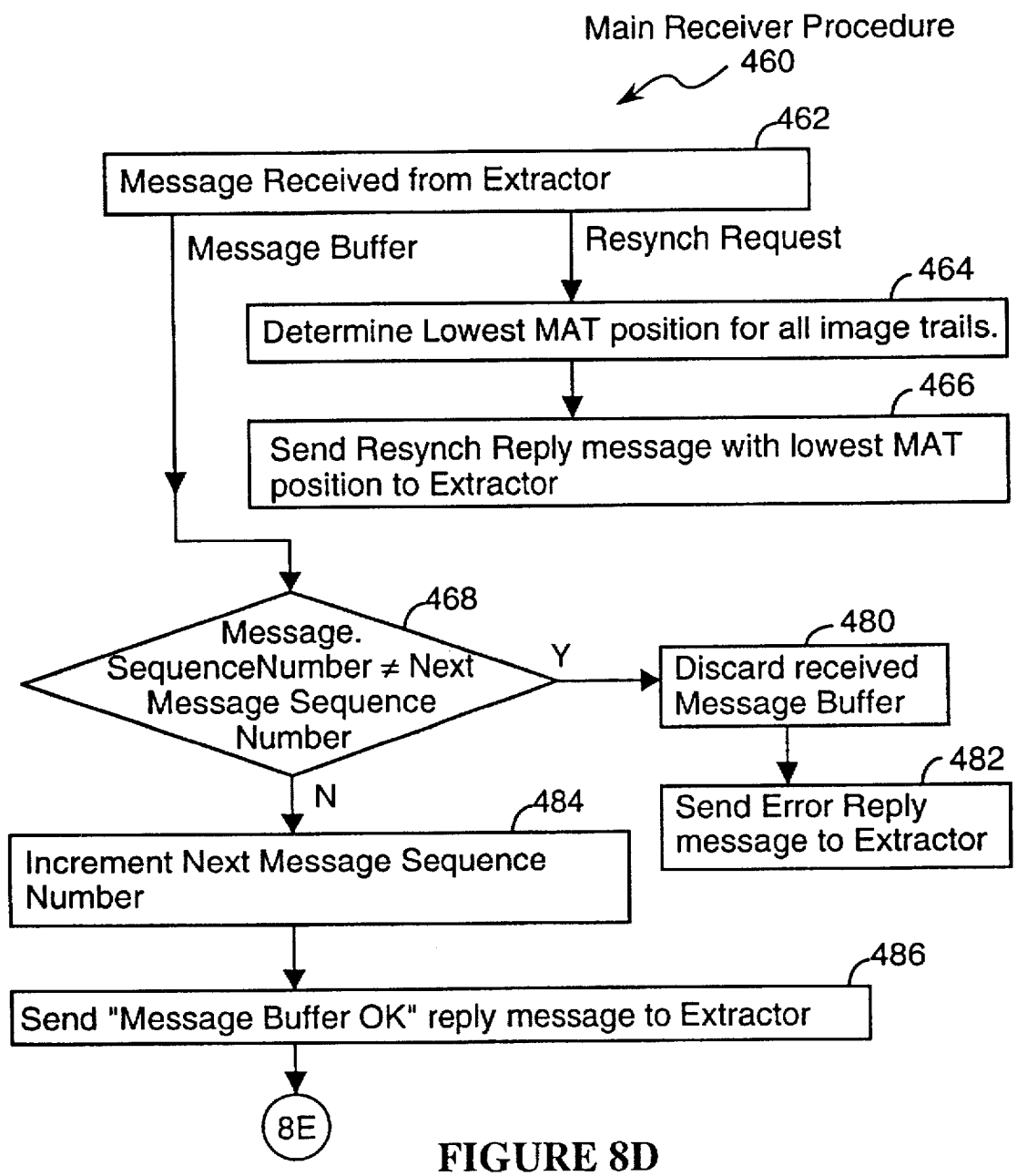
Figure 8E:
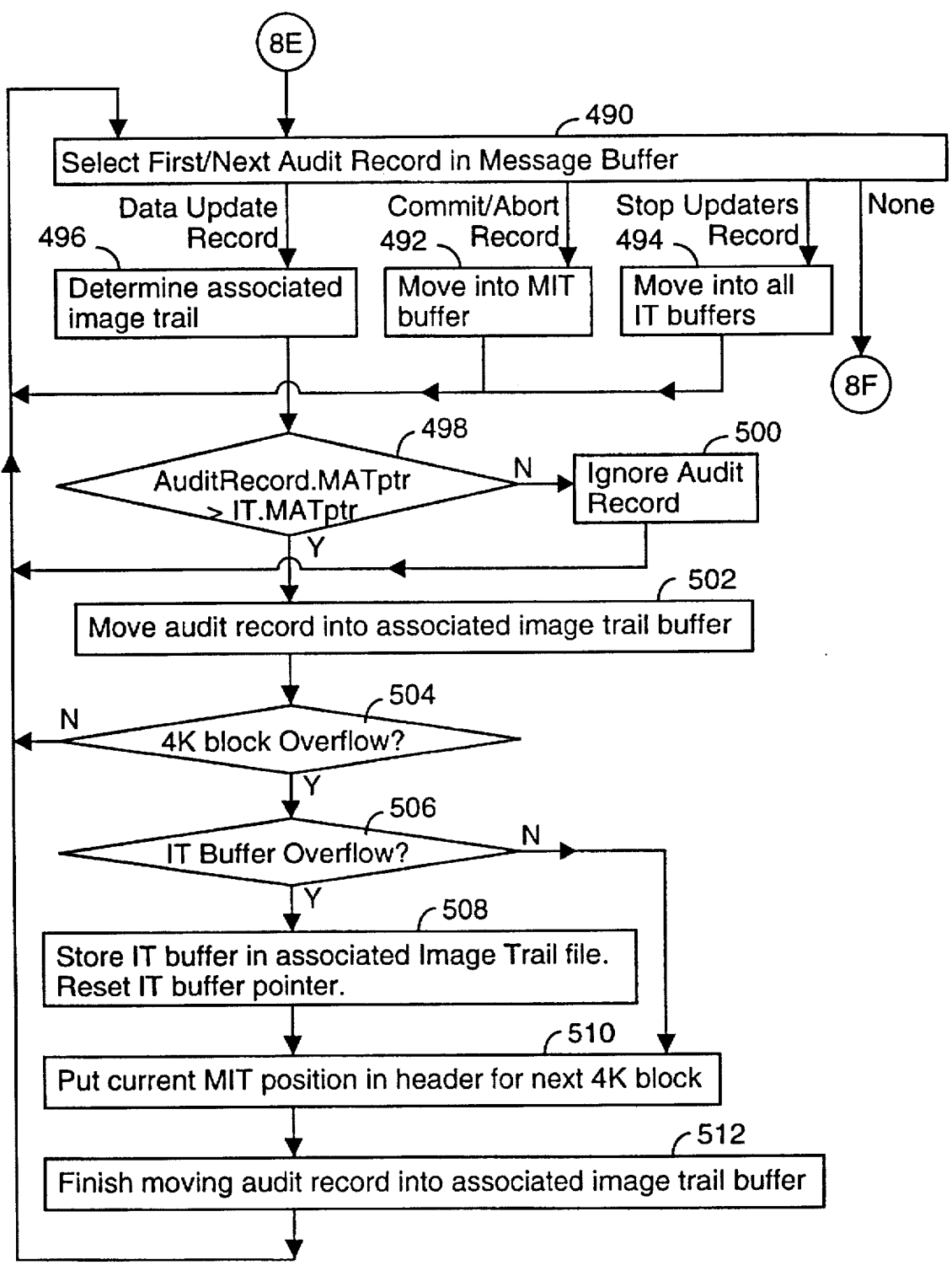
Figure 8F:
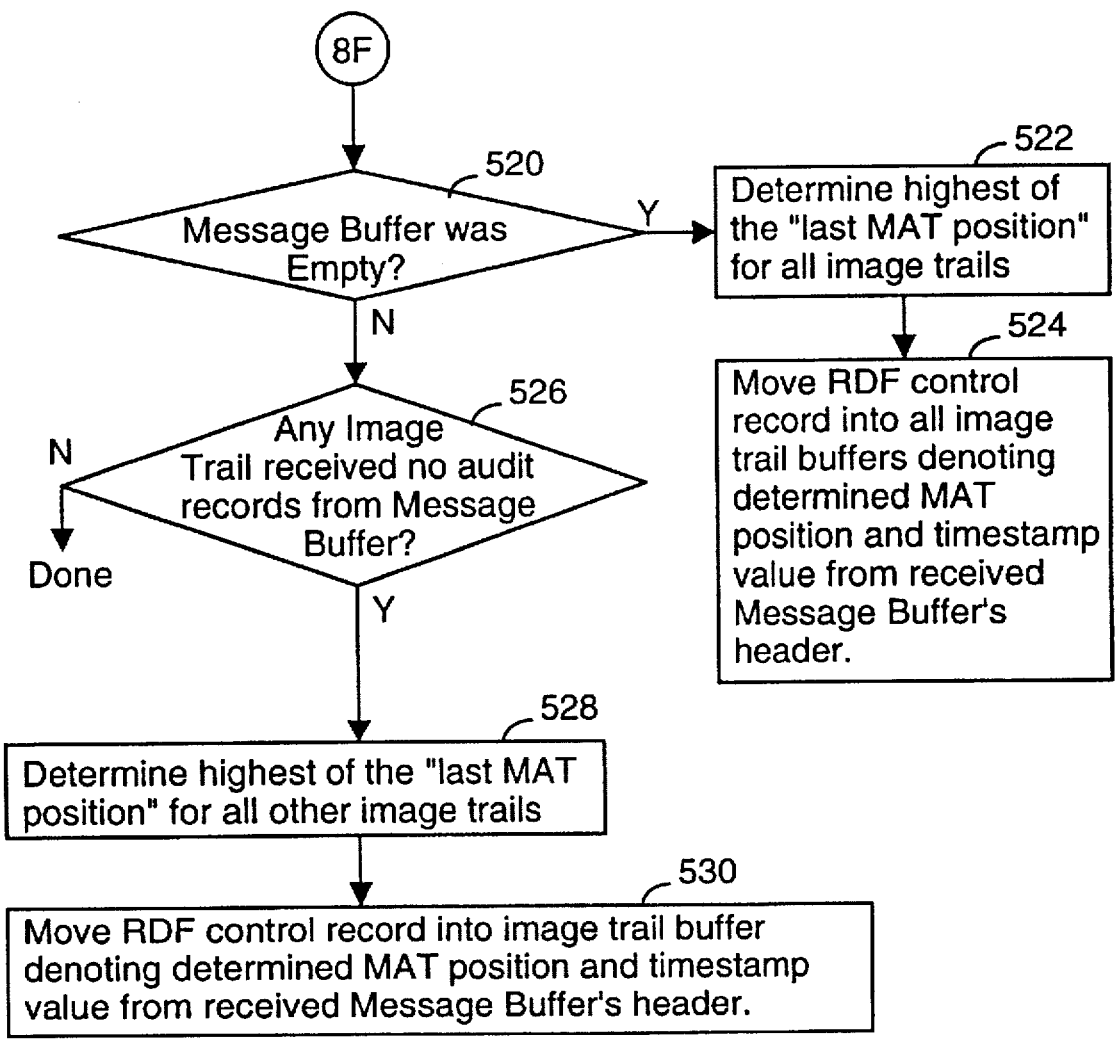
Figure 8G:
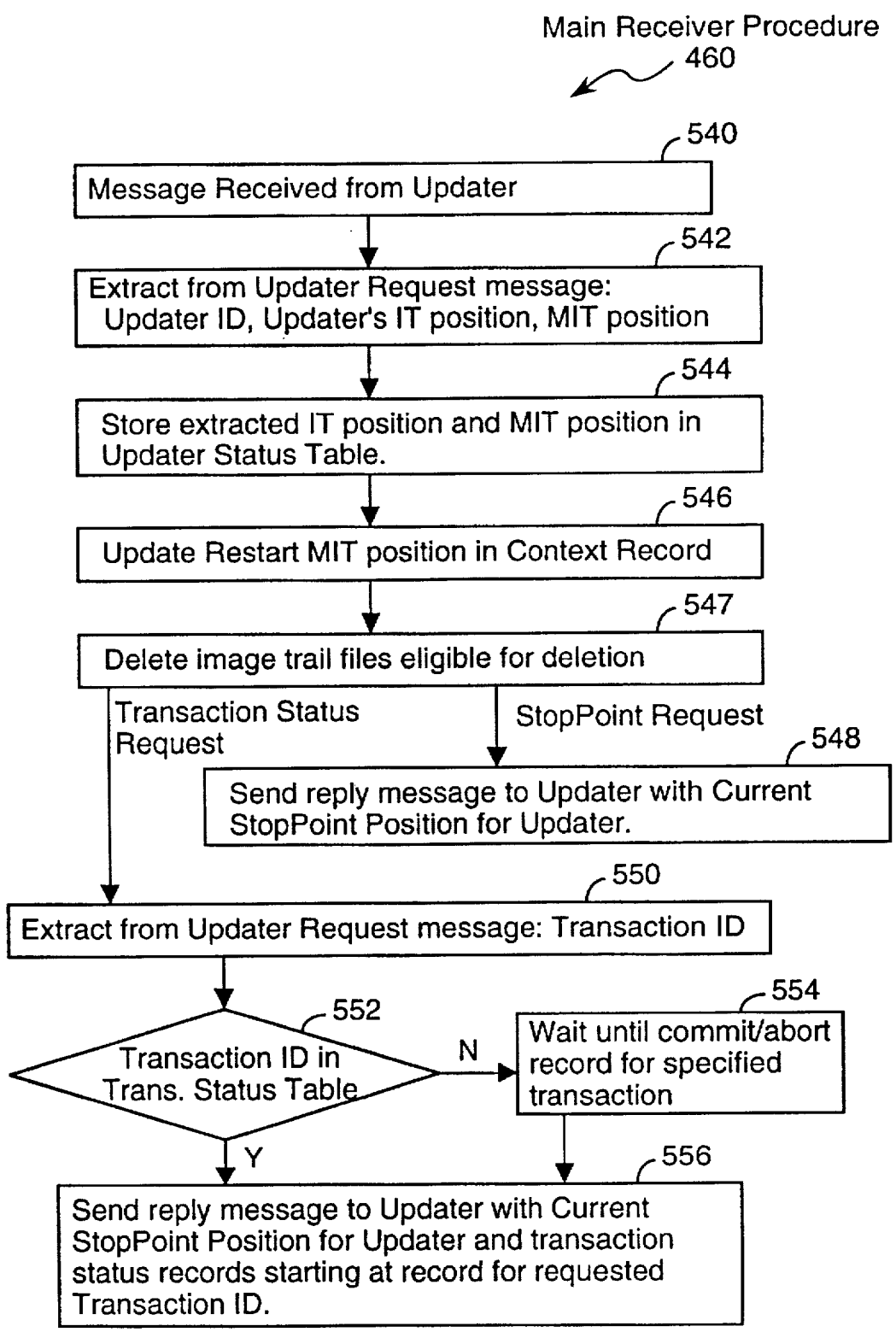

Referring to FIG. 8B, the Receiver Volatile Initialization procedure 450 is called during startup by the Receiver Startup procedure 440. The Receiver Volatile Initialization procedure 450 begins by reading the last stored Receiver context record from disk and using it as the receiver's current context record in volatile memory (452). Then the Receiver Volatile Initialization procedure allocates and initializes all volatile data structures (454) used by the Receiver process, including the image trail buffers 274, the image trail buffer status array 392, the updater status array 400 and the transaction status table 144. Then the Receiver Volatile Initialization procedure sets the receiver's Expected Message Sequence Number to "1" (456). This will force the receiver and extractor to resynchronize, unless the extractor is starting up at the same time such as in response to a "Start RDF" command. Finally, the Volatile Initialization procedure calls (458) the main Receiver procedure 460.

Referring to FIGS. 8C–8F, the Main Receiver procedure 460 includes a subprocedure 470 for periodically saving the receiver's context record. This subprocedure is called every M seconds, where M is preferably a value between 5 and 25 and is typically set to 15. The first step (472) of the context save procedure durably stores the contents of each image trail buffer to its associated image trail file and resets all image trail buffer pointers (in IT buffer status table 392) to point to the beginning of each image trail buffer 274. The subprocedure also copies the current MIT end of file position from the context record into the first block header 394 in each of the image trail buffers. Then the subprocedure waits for the writes to the image trail files to complete (472).

Once the image trail buffer contents have been written to disk, the receiver's context record is durably stored on disk using a WaitUntilComplete write operation (474) (i.e., the step does not complete until the associated disk process sends a completion message back to the receiver process). Finally, the image trail file locations in the context record are copied into the StopPoint locations in the Updater Status table 400 (476). This last step allows the Updaters to process records up through the last audit image record stored on disk prior to the last context save operation.

The receiver process 232 is a "passive" process in that it does not initiate messages to other processes. Rather it only responds to messages from the extractor process 230, messages from the updater processes 234, and from the monitor process 240.

When a message is received from the extractor process (462), if the message is a Resynch request message, the receiver determines which of the MAT positions listed in the context record is lowest (464), and sends a Resynch Reply message to the extractor with the determined lowest MAT position embedded in the reply message (466).

If the received extractor message is a message buffer message, the message sequence number (denoted Message.SequenceNumber) in the received message is compared with the locally stored Next Message Sequence Number (468). If the received message sequence number is not equal to the locally stored Next Message Sequence Number, the received message buffer is discarded (480) and an Error Reply message is sent to the extractor (482).

If the received message sequence number is in sequence, the locally stored Next Message Sequence Number is incremented by one (484) and a "Message Buffer OK" reply is sent to the extractor (484). A message buffer identifier is associated with the received message and is also associated with the reply message so that the extractor can properly update its message buffer status table by marking the acknowledged message buffer as available.

Next, all the audit records in the received message buffer are processed in sequence (490). Each commit/abort audit record is moved into the MIT buffer 274-1 (492). Each "Stop Updaters" record is processed as follows. The MAT position (AuditRecord.MATptr) in the StopUpdaters record is compared with the MAT position (IT.MATptr) for each identified image trail. If the MAT position of the StopUpdaters records is higher than the MAT position of any image trail (in which case it will be higher than the MAT position for all the image trails) (A) the StopUpdaters records is moved or copied into all the image trail buffers 274 record (494) and (B) the Receiver.StopUpdatersCnt 391 count value in the receiver context record 270 is incremented.

Each data update audit record is processed as follows. First, the image trail associated with the record is determined (by determining the database object updated on the primary system, determining the volume on which that object is stored, determining the updater responsible for replicating RDF protected files on that volume and then determining the image file associated with that updater) (496). Next, the MAT position (AuditRecord.MATptr) in the audit record is compared with the MAT position (IT.MATptr) for the identified image trail. If the audit record's MATptr is not larger than the image trail's MATptr, the audit record is ignored (500) because it has already been processed by the receiver.

Otherwise, the audit record is moved into the identified image trail buffer (502). However, if doing so would overflow a 4K byte block within the image trail buffer (504) special processing is required (see description of steps 510, 512 below). Furthermore, if moving the audit record into the image trail buffer would overflow the last block in the image trail buffer (506) the entire image trail buffer through the last 4K block is durably stored in the associated image trail file, the receiver's context record is updated to reflect the new end of file position for the image trail file, any data in the overflow block is moved up to the beginning of the image trail buffer, and then the buffer pointer for that buffer is reset to point to the next available slot near the beginning of the image trail buffer (508).

If either a 4K byte block has been overflowed, or the entire message buffer has overflowed, the current MIT file position (which is the MIT file position associated with the last audit record written to the MIT message buffer) is stored in the header for the next 4K block in the image trail buffer (510). Then the process of moving the current audit record into the image trail buffer is completed (512) and processing of the next audit record (if any) in the received message buffer begins at step 490.

If the received message buffer was empty (520), the receiver determines the highest of the MAT positions stored in the context record for all the image trails, which is equal to the MAT position of the last audit record received from the extractor in the last message buffer received that contained any audit records. Then an "RDF control record" is moved into all the image trail buffers (524). The RDF control record denotes (A) the determined highest MAT position, and (B) the timestamp value in the received message buffer's header.

If the received message buffer was not empty (520), but if one or more image trails received no audit records from the current message buffer (526), the receiver determines the highest of the MAT positions stored in the context record for all the other image trails (528), which is equal to the MAT position of the last audit record received from the extractor in the current message buffer. Then an "RDF control record" is moved into each image trail buffer that did not receive any audit records (530). The RDF control record denotes (A) the determined highest MAT position, and (B) the timestamp value in the received message buffer's header.

When a message is received from any updater process (540), the message is initially processed by extracting from the updater request message (A) the updater's identifier, (B) the updater's current image trail position, and (C) the last MIT position read by the updater from a block header in the updater's image trail (542). The extracted Image trail position and MIT position are stored in the Updater Status table (544). Using the updated information in the Updater Status table, the Restart MIT position in the receiver's context record is updated to be equal to the lowest MIT position for all the updaters (546). In addition, the receiver process deletes any image trail files eligible for deletion based on the updated image trail position values received from the updater (547).

If the received Updater request message is a StopPoint request message, the receiver reads the current StopPoint location for the updater and sends a reply message with that StopPoint location to the requesting updater (548).

If the received Updater request message is a Transaction Status request message, the receiver extracts from the request message the Transaction identifier for which the updater is requesting a status value (550). Then the transaction status table 144 is inspected to see if the status of that transaction is known (552). If not, the receiver waits until a commit/abort record for the specified transaction is received from the extractor (554). Once the transaction status of the identified transaction is known, a reply message is sent to the requesting updater (556). The reply message includes (A) the current StopPoint for the updater, and (B) a set of transaction status records, starting with the record for the identified transaction. Preferably a substantial number of transaction records (e.g., 200 records, or all the status records in the TST 144 after the identified record if less than 200) is sent with each reply so as to reduce the number of Transaction Status requests sent by updaters.

DETAILED EXPLANATION OF UPDATER PROCESSES

Figure 9:
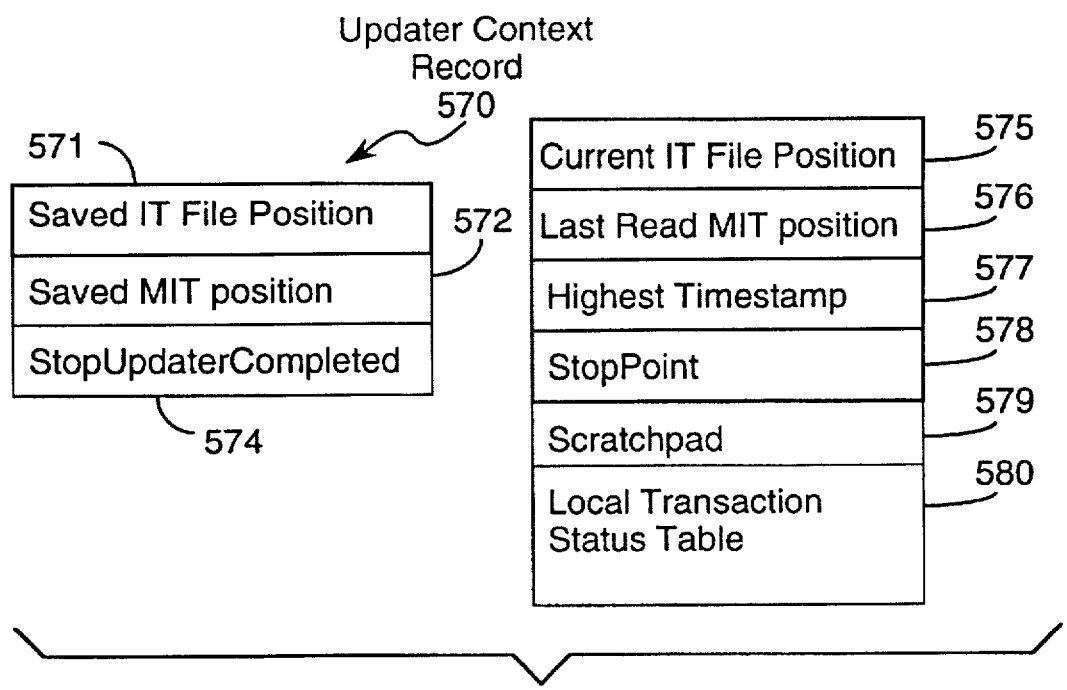
FIG. 9 is a block diagram of data structures, stored in primary memory, used by each updater process in a preferred embodiment of the present invention.

The primary data structures used by each updater process 234 in the preferred embodiment are shown in FIG. 9. Each updater process durably stores a context record 570 on a nonvolatile (disk) storage device on a periodic basis (e.g., once every 2 to 10 minutes, with 5 minutes being preferred). As shown in FIG. 9 the context record includes a saved image trail file position 571, a saved last MIT position 572, and a StopUpdaterCompleted flag 574. Each updater also stores in volatile memory

- a current image trail file position 575,
- a "Last Read MIT Position 576, which is the last MIT position read by the updater from a block header in the updater's image trail,
- a Highest Timestamp value (577), equal to the highest timestamp of any audit record processed by the updater,
- a StopPoint image trail file position (578),
- a scratch pad (579) for processing audit records, and
- a local transaction status table (580) provided to the updater by the receiver process.

The Highest Timestamp value 577 is not used by the RDF procedures discussed here. However, it is accessible by procedures executed by the Monitor process 240 for monitoring how far the updaters are running behind the TM/MP 202, and thus how long it would take the RDF system 220 to synchronize the backup database 124 with the primary database 108 if all transactions on the primary system were to stop.

Referring to FIGS. 10A–10E, and the pseudocode in Appendix 3, the updater processes 234 work as follows.

Figure 10E:
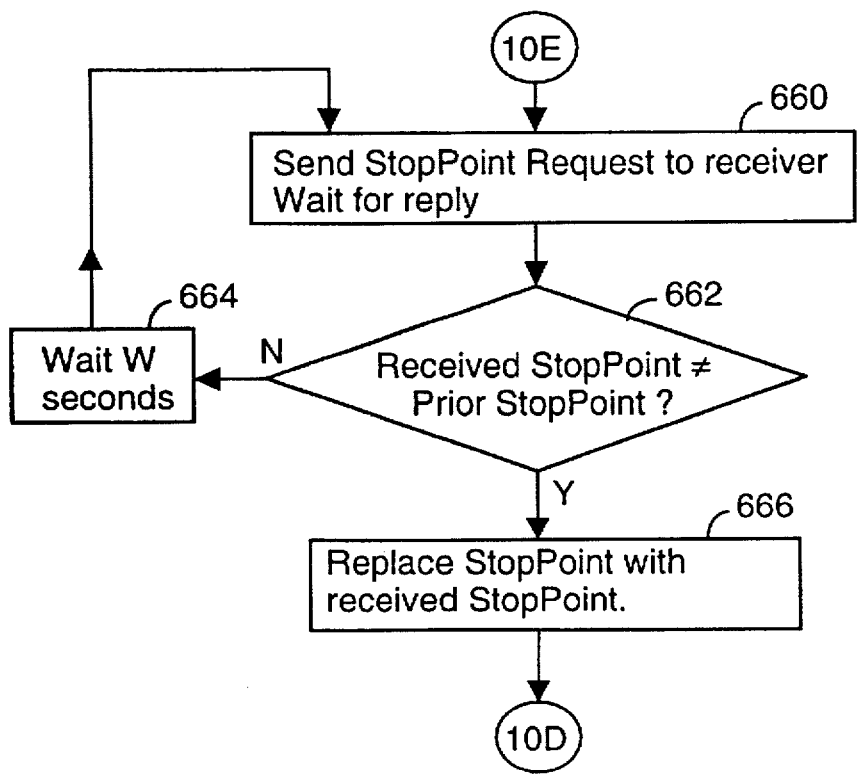
FIGS. 10A-10E are flowcharts of procedures executed by the updater processes in a preferred embodiment of the present invention.
Figure 10A:
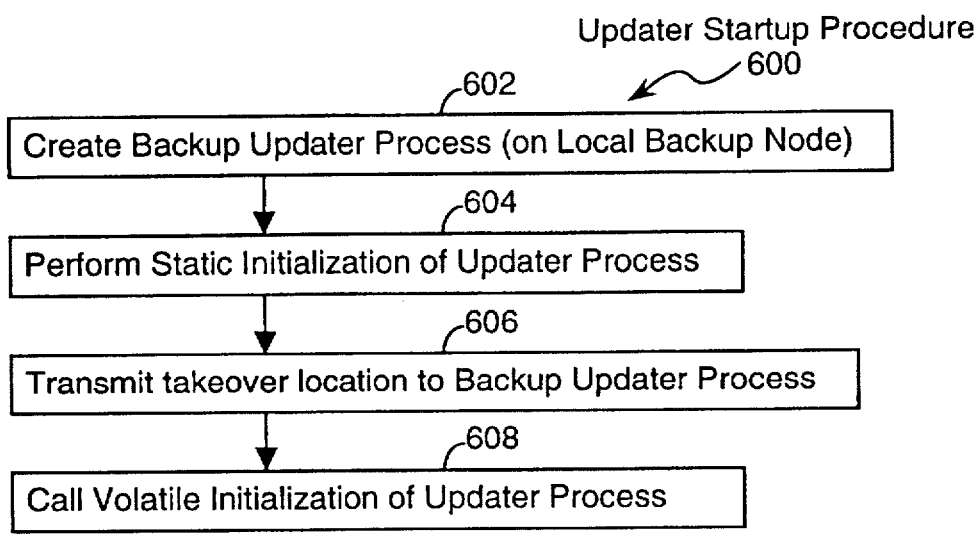

Referring to FIG. 10A, the Updater Startup Procedure 600 is called whenever any updater process 234 is started. The Updater Startup procedure begins by creating a backup process (602). The startup procedure then performs a "static initialization" of the updater process (604), which means that all static data structures (such as a map of primary volumes to backup volumes) used by the updater process are allocated and initialized. Then a checkpoint operation is performed in which a takeover location is transmitted to the backup updater process (606). The takeover location is, in essence a program address, and in the preferred embodiment the takeover location is the program location at which execution of the Updater Volatile Initialization procedure 610 begins. Finally, the Updater Startup procedure calls (608) the Updater Volatile Initialization procedure 610.

Figure 10B:
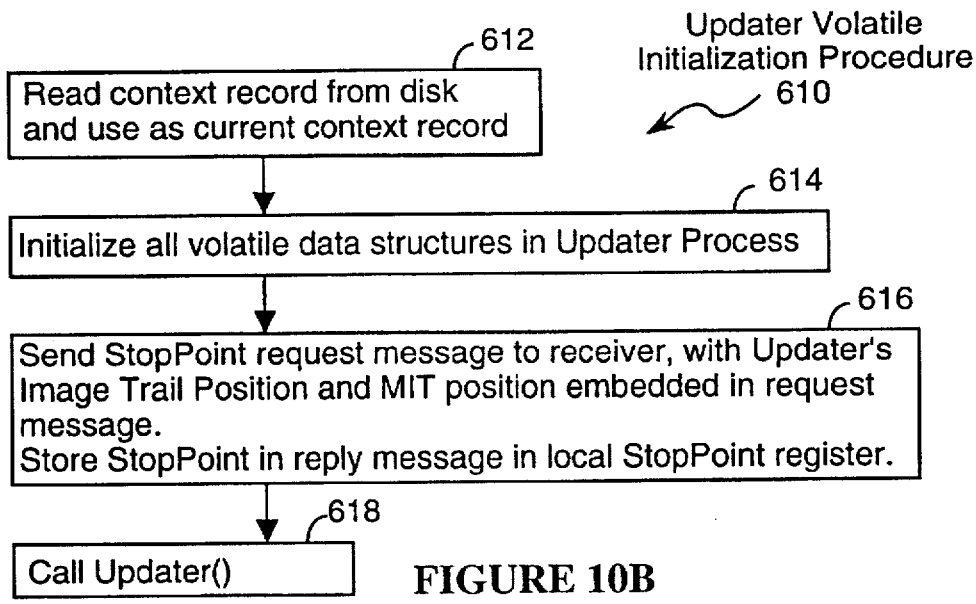

Referring to FIG. 10B, the Updater Volatile Initialization procedure 610 is called during startup by the Updater Startup procedure 600. The Updater Volatile Initialization procedure begins by reading the last stored Updater context record from disk and using it as the updater's current context record in volatile memory (612). Then the Updater Volatile Initialization procedure allocates and initializes all volatile data structures (614) used by the Updater process, including the scratchpad 579 and local transaction status table 580. Then the Updater Volatile Initialization sends a StopPoint request message to the receiver with the updater's current image trail position and MIT position embedded in the message, and stores the StopPoint value in the resulting reply message in its local StopPoint register 578. Finally, the Volatile Initialization procedure calls (618) the main Updater procedure 620.

Figure 10C:
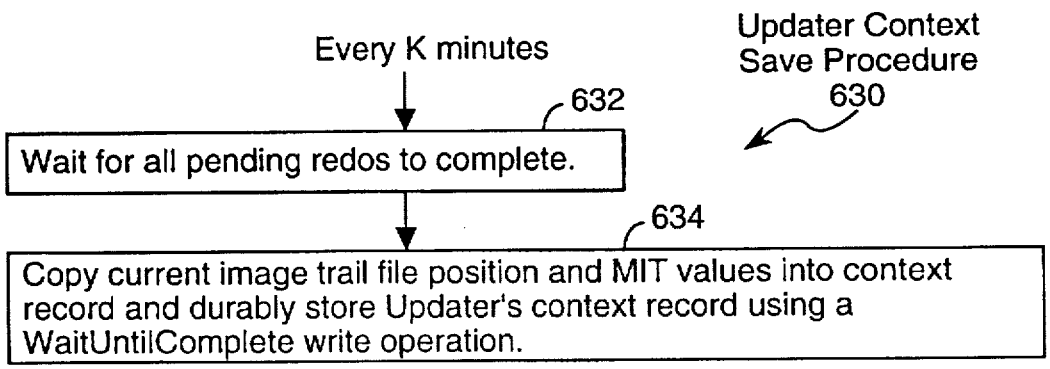
Figure 10D:
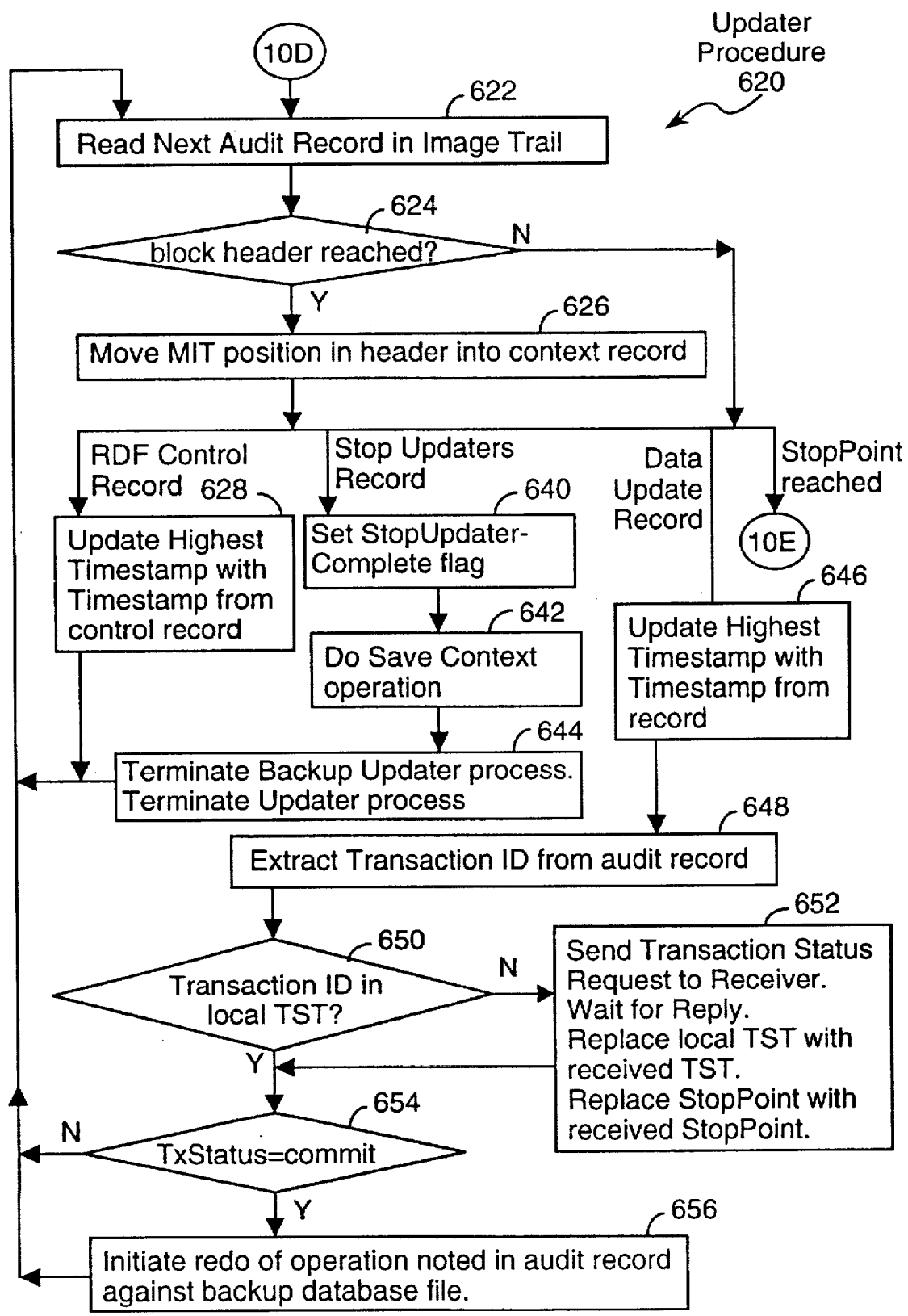

Referring to FIGS. 10C–10E, the Main Updater procedure 620 includes a subprocedure 630 for periodically saving the updater's context record. This subprocedure is called every K minutes, where K is preferably a value between 2 and 10 and is typically set to 5. The first step (632) of the updater context save procedure 630 is to wait for all currently pending redo operations to complete so that the data stored in the updater's backup disk volume is known to reflect all updates through the last audit record read by the updater. Then the updater context save procedure copies the current Image Trail File Position 575 and the current Last Read MIT Position 576 into the corresponding fields of the context record 570, and durably stores the context record 570 on disk (634).

Referring to FIGS. 10D and 10E, the primary job of the Main Updater procedure 620 is to process audit image records in its image trail. At step 622 it reads the next audit record, if any, in the image trail. If, while reading that record, a 4K byte block header is encountered (624), the MIT position denoted in that header is moved into the updater's current MIT position register 576 (626).

If the audit record just read is an "RDF Control" record, the Highest Timestamp register 577 is updated by storing in it the timestamp in the RDF control record (628). Then processing resumes with next audit record (622).

If the audit record just read is a "Stop Updaters" record, the "StopUpdaterCompleted flag 574 in the Updater context record 570 is set to True (640) and the Updater context save procedure 620 is called (642). The StopUpdaterCompleted flag 574 is read by the Monitor process to ensure that all Updaters have stopped and that all have processed their image trails through the StopUpdaters record (as opposed to stopping due to a failure). Then the updater's backup process is terminated and the updater process itself terminates (644). The updater process will startup again after the operator of the RDF system performs on the remote backup system the DDL operation which created the Stop Updaters audit record and then enters either the "Start Update" or "Takeover" command.

If the audit record just read is a database object update (i.e., data update) record, the Highest Timestamp register 577 is updated by storing in it the timestamp from the audit image record (646). The transaction identifier is extracted from the audit record (648). Then the local transaction status table 580 is inspected to see if it contains a status record for the identified transaction (582). If not, a Transaction Status Request message is sent to the receiver (652). When a reply message is received, the local transaction status table 580 is replaced with the transaction status table embedded in the reply message, and the StopPoint stored in StopPoint register 578 is replaced with the StopPoint value embedded in the reply message.

Once the local status transaction table contains a status record for the identified transaction, the transaction status of that transaction is determined (654). If the transaction status is "commit," a redo of the database object update operation noted in the audit record is initiated against the backup database file (656). If the transaction status is "abort," the audit record is not further processed. In either case, processing resumes with next audit record (622).

When the attempt to read a next audit record (622) encounters an audit record at or beyond the StopPoint value in StopPoint register 578, a StopPoint request message is sent to the receiver (660) to determine whether the StopPoint for the updater has been advanced. When a reply message is received, the StopPoint value in the received message is compared with the locally stored StopPoint value (622). If the two are equal, the updater 234 cannot process any further audit image records. As a result, the updater waits for W seconds (664), where W is preferably a value between 1 and 10 and is typically set to 5, and then sends another StopPoint request message to the receiver (660). This continues until a new StopPoint value is received from the receiver. At that point the locally stored StopPoint value in StopPoint register 578 is replaced with the StopPoint value in the received reply message, and then processing of audit image records resumes at step 622.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

- 38 -

APPENDIX 1
PSEUDOCODE FOR EXTRACTOR PROCESS

```
       Procedure: Startup Extractor()
  5    Upon Startup of Extractor:
           {
           Create a backup extractor process
           Perform static initialization of Extractor process
           Transmit a takeover location to the backup extractor process
 10        Call Volatile Initialization of Extractor()
           }

Procedure: Volatile Initialization of Extractor()
           {
 15        Initialize all volatile data structures in Extractor process
           Send request message to Receiver process asking for safe MAT to use
           Wait for Resynch Reply Message from Receiver process
           Set MATptr to MAT value received from RDF Receiver process
           Set Extractor's Message Sequence Number to 1
 20        Call Extractor()
           }

Procedure: Extractor()
       Initialize and start Msg Timer    /* times out once J every seconds (typically,
 25                                         once every one or two seconds */
       /* MATptr points to the next audit record to be processed */
       Do Forever
           {
           Read next audit record, if any
 30        If record is associated with an audited database table on an RDF
               protected volume, is a commit/abort record, or is a StopUpdaters
               record
               {
               Insert MATptr into audit record
 35            If record is a StopUpdaters record
                   {
                   Send StopUpdaters record to Monitor Process using a waited
                       message send.
                       /* Extractor process waits for reply from Monitor */
```

- 39 -

```
            }
            Append to audit record a Timestamp from the last read commit or
                abort record
            If there sufficient room in Message Buffer to store audit record
 5              Move augmented audit record into Message Buffer
            Else
                {
                Insert Message Sequence Number in message buffer header
                Insert timestamp from the last read commit or abort record in
10                  Message Buffer header
                Transmit Message Buffer to RDF Receiver
                Update message buffer status array
                Clear and restart MsgTimer
                Increment Message Sequence Number
15              Move augmented audit record into next Message Buffer when it
                    becomes available  /* either buffer is already available or
                    Extractor will wait until one becomes available via
                    acknowledgement from Receiver */
                }
20          }
        }

In Background:
    Do Forever:
25      {
        If Msg Timer has timed out
            {
            If Message Buffer contains no audit records
                Insert current timestamp in Message Buffer header
30          Else
                Insert timestamp from the last read commit or abort record in
                    Message Buffer header
            Insert Message Sequence Number in Message Buffer header
            Transmit Message Buffer to Receiver process
35          Update message buffer status array
            Increment Message Sequence Number
            Restart Msg Timer
            }
        Whenever a reply message is received from the Receiver process
```

- 40 -

```
    {
    If message is a "Audit Message" acknowledgement
        {
        If message is a "Message Buffer OK" reply message
5           {
            Update Message Buffer Status array to indicate that the
                corresponding message buffer is available for use
            }
        Elseif message is an "Error / Need Resynch" reply message
10          {
            /* Need to resynchronize Extractor and Receiver Processes
        */
            Wait for any other pending message acknowledgement
                replies to be received (and ignore them)
15          Call Volatile Initialization of Extractor()
            }
        }
    }   /* End of reply message processing */
}   /* End of background Do Loop */
```

- 41 -

APPENDIX 2

PSEUDOCODE FOR RECEIVER PROCESS

```
     Procedure: Startup Receiver Process()
5    {
     Create a Backup Receiver Process
     Perform static initialization of Receiver process
     Transmit a takeover location to the Backup Receiver process
     Call Receiver Volatile Initialization()
10   }

Procedure: Volatile Initialization of Receiver()
         {
         Recover last stored context record and use as current context record (in
15           memory)
         Initialize all volatile data structures in Receiver process, including
             transaction status table and image trail buffers
         Set Next Message Sequence Number to 1
             /* Setting SeqNo to 1 forces resynchronization */
20       Call Receiver()
         }

Procedure: Receiver()
     {
25   /*  Save Receiver Context Subprocedure */
     Every M seconds /* M is typically between 5 and 25, with 15 being
     preferred */
         {
         Store all IT buffers in associated Image Trail files
30       Reset IT buffer pointers
         Put current MIT file position in header of the first 4K block of each IT
     buffer
         Wait for writes to Image Trail files to complete 35       Durably store Context record using a WaitUntilComplete write operation
         Copy IT File locations from Context record to StopPoint locations in
             Updater Status Table
         }
```

- 42 -

```
     When an Extractor Resynch request message is received
         {
         Determine lowest MAT position for all the image trails
         Send Resynch Reply Message with lowest MAT position to Extractor
 5       }

Upon Receiving a Message Buffer
         {
         If Message.SequenceNumber ≠ Next Message Sequence Number
10           {
             Discard received message buffer
             Send "Error / Need Resynch" Reply Message to Extractor
             }
         Else
15           {
             Increment Next Message Sequence Number
             Send "Acknowledgement" Reply Message to Extractor process
             For each data update record
                 {
20               Determine associated Image Trail
                 If MAT value in data update record is greater than the MAT
                     value for the last audit record moved into the associated
                     Image Trail Buffer
                     {
25                   Move data update record into the associated Image Trail
                         buffer
                     }
                 Else
                     }
30               Ignore data update record   /* it was already written to the
                                                   image trail */
                 }
                 }
             Move all commit/abort records to buffer for Master Image Trail
35           Copy each "RDF Stop Updaters" record into buffers for all image
     trails When any 4K block in the image trail buffer is full
                 Put current MIT position in header for the next 4K block
```

- 43 -

When any image trail buffer is too full to accept a record or new
   block header
   {
   Using an Unwaited Write, durably store the data in the buffer in
      the associated image trail file
   Reset Pointers to beginning of buffer
   Resume updating block headers and moving audit record(s) into
      the image trail buffer
   }

Whenever a received message buffer is empty
   {
   Determine highest MAT of the "last MAT positions" for all the
      Image Trails
   Write an RDF control record into all Image Trail buffers denoting
      the determined MAT position and the timestamp value in
      the message buffer's header
   }

When a received message buffer is not empty and any Image Trail
   (an inactive Image Trail) receives no data update records from
   the last received Message Buffer
   {
   Determine highest MAT of the "last MAT positions" for the other
      Image Trails
   Move an RDF control record into the inactive Image Trail's
      buffer denoting the determined MAT position and the
      timestamp from the Message Buffer header
   }

}
} /* End of processing for a received message buffer of audit image
records

In Background:
   {
   Read all commit/abort records written to Master Image Trail and update
      Transaction Status Table accordingly
   }

- 44 -

```
    When any request is received from an Updater
        {
        Extract from Updater message the identity of the sending Updater, the
            Updater's current Image Trail position and MIT position
 5      Store Image Trail Position and MIT position in Receiver's Updater
            Status Table
        Update Restart MIT position in Context Record (in memory)
        Delete any image trail files eligible for deletion based on updated image
            trail position values.
10
        When request is a StopPoint request
        /* StopPoint Request message is sent by an Updater when it restarts,
            reaches its StopPoint, or reaches end of its audit trail */
            {
15          Send reply message to Updater specifying its current StopPoint
                location
            }

When the request is a Transaction Status request
20          {
            Extract Transaction ID from Request
            Attempt to locate the status record in the transaction status table
                (TST) for that Transaction ID
            If record is not found
25              {
                Wait until commit/abort record is received from Extractor for the
                    specified transaction
                Update transaction status table with receiver commit/abort
                    information
30              }
            Send Reply Message to requesting Updater with StopPoint position
                for Updater and N status records, starting at the located record
                (Send all status records to end of status table if number of
                records in table after the located record is less than N)
35          /* N is typically 200 or larger */
            }
        }   /* end of processing of Updater Request */
    }   /* end of Receiver procedure */
```

- 45 -

APPENDIX 3
PSEUDOCODE FOR EACH UPDATER PROCESS

```
     Procedure: Startup Updater()
 5   /* startup caused by either "Start RDF" or "Start Update" commands */
     {
     Create a Backup Updater Process
     Perform static initialization of Updater process
     Transmit a takeover location to the Backup Updater process
10   Call Volatile Initialization of Updater()
     }

Procedure: Volatile Initialization of Updater()
     {
15   Read last stored context record and use as current context record (in
             memory) /* includes current image trail position and MIT position */
     Initialize all volatile data structures in Updater process, including file and
             buffer structures 20   Send StopPoint Request Message to Receiver process, including
             Updater's current Image Trail position and MIT position in the
             message
     Wait for reply
     Extract StopPoint position from Reply Message
25   Call Updater()
     }

Procedure: Updater()
     Do Forever
30   {
     /*   Save Updater Context Subprocedure */
     Every K minutes    /* K is typically between 2 and 10, with 5 being
                              preferred */
         {
35       Wait for all pending redos to complete
         Durably store Context record using a WaitUntilComplete write
     operation
         }
```

- 46 -

```
        Read next record in Image Trail, but do not go beyond the last
            StopPoint specified by the Receiver process
        If at StopPoint
            {
 5          Do Until current Image Trail position ≠ StopPoint
                {
                Once every W seconds, Send a StopPoint Request message to
                    the Receiver  /* W is typically a value between 1 and 10 */
                Wait for Reply
10              Extract StopPoint from reply message
                }
            }
        If block header was encountered
            Get MIT position from block header and store MIT position in
15              Updater's context record
        BEGIN CASE (audit record type)
            {
            Case: record type = RDF Stop Updaters record
                {
20              Perform normal context save operation, including durably
                    storing context record
                Terminate backup Updater Process
                Terminate Updater Process
                }
25          Case: record = RDF control record
                {
                Update local HighestTimestamp with timestamp from record
                }
            Case: record = data update record
30              {
                Update local HighestTimestamp with timestamp from record
                Determine transaction ID of update
                Check local transaction status table for status of identified
                    transaction
35              If transaction ID is not found
                    {
                    Send a Transaction Status Request to the Receiver
                        process, denoting the transaction ID not found in the
                        local status table.  Include in the request message the
```

- 47 -

```
                    current MIT position in the Updater's context record and
                        the position of the current record in the Image Trail file
                    Wait until Receiver sends Reply Message with status data
                    Replace local status table with status data received from
5                       Receiver (typically includes status records for 200 or
                        more transactions)
                }
                TxStatus = commit/abort status indicated in status table for
                    identified transaction
10              If TxStatus=commit
                {
                Initiate a redo of the operation noted in the audit record
                    against the backup database file. (The redo operation
                    is performed by disk process for the volume on which
15                  the file is located on the remote backup system.)
                }
            } /* processing of data update record ends here */
        } /* End of Case Statement */
    } /* End of Do Loop */
```

What is claimed is:

1. A distributed computer database system, comprising:

a local computer system having a local database stored on local memory media, application programs that modify the local database, and a transaction manager that stores audit records in a local audit trail reflecting those application program modifications to the local database; each audit record having an associated audit trail position in said local audit trail;

a remote computer system, remotely located from the local computer system, said remote computer system having a backup database stored on memory media associated with the remote computer system;

a communication channel for sending messages between said local computer system and said remote computer system; and a remote data duplication facility, partially located in said local computer system and partially located in said remote computer, for maintaining virtual synchronization of said backup database with said local database, including:

an extractor process executed by said local computer system that extracts audit records from said local audit trail and transmits said extracted audit records to said remote computer system; said extractor process including a plurality of message buffers and instructions for buffering groups of said extracted audit records together in said message buffers and transmitting said message buffers to said remote computer system, each transmitted message buffer having an associated sequence number, wherein sequentially transmitted messages buffers have associated sequence numbers that follow a predefined sequence; said extractor process instructions including instructions for continuing, after transmitting a first one of said message buffers to said remote computer system, to buffer groups of said extracted audit records in other ones said message buffers and for transmitting said other message buffers to said remote computer system;

a receiver process executed by said remote computer system that stores an expected message sequence number and a context record denoting a restart audit trail position, receives said message buffers transmitted by said extractor process, responds to each received message buffer whose associated message sequence number does not match said expected message sequence number by transmitting an error message to said extractor process; and responds to each received message buffer whose associated message sequence number matches said expected message sequence number by sending a reply message to said extractor process to acknowledge receipt of each said message buffer, updating said expected message sequence number in accordance with said predefined sequence, distributing said audit records in said received message buffer to one or more image trail files in said remote computer system, and updating said restart audit trail position based on said audit trail positions associated with said audit records in said received message buffer; and one or more updater processes executed by said remote computer system, wherein each updater process reads said audit records in an assigned one of said image trail files and initiates redo operations of database modifications denoted in at least a subset of said read audit records against said backup database;

said extractor process including reply message instructions for responding to said reply message acknowledging receipt of one of said message buffers by said receiver process by enabling reuse of said one message buffer, and error reply message instructions for responding to said error message transmitted by said receiver process by determining said restart audit trail position stored by said receiver process and then extracting audit records from said local audit trail starting at said restart audit trail position.

2. The system of claim 1 wherein said extractor process includes instructions to request said restart audit trail position from said receiver process in order to resume extraction of said audit records at said restart audit trail position when a failure occurs within said local computer system.

3. The system of claim 1, wherein said extractor process includes initialization instructions, which include said error reply message instructions, to allocate and initialize all volatile data structures used by said extractor process and to request said restart audit trail position from said receiver process in order to resume extraction of said audit records at said restart audit trail position whenever said extractor process is started or restarted within said local computer system and whenever said extractor process receives said error message transmitted by said receiver process.

4. The system of claim 1, wherein said receiver process including instructions for responding to each received message buffer whose associated message sequence number matches said expected message sequence number by sending said reply message to said extractor process to acknowledge receipt of each said message buffer before distributing said audit records in said received message buffer to said image trail files in said remote computer system.

5. The system of claim 1, wherein said image trail files consist of at least one master image trail file and one or more auxiliary image trail files, each auxiliary image trail file including a subset of said audit records denoting modifications to contents of said local database, said master image trail file having a second subset of said audit records, said second subset of said audit records including at least some audit records that each denote a commit/abort status of a respective transaction associated with audit records in said auxiliary image trail files.

6. The system of claim 5, wherein each of said auxiliary image trail files has an associated auxiliary image buffer and each of said master image trail files has an associated master image buffer, said buffers used to temporarily store said audit records prior to storage in their respective image trail file; and said receiver process including instructions to periodically store said audit records of each auxiliary image buffer in said associated auxiliary image trail file and also to store an associated storage location for each auxiliary image trail file in a receiver context record, said receiver context record used to resume execution of said receiver process when a predefined condition occurs.

7. The system of claim 6, said receiver process including instructions to:

distribute audit records from each message buffer to said auxiliary image buffers and said master image trail buffer, and for periodically storing in each auxiliary image buffer an associated master image file position denoting a location of a last one of said audit records from said each message buffer distributed to said master image trail buffer;

generate a transaction status table from said audit records denoting a commit/abort status of said respective transactions;

respond to requests from said updater processes for transaction commit/abort status information, each said request from one of said updater processes including a last one of said master image file positions read by the one updater process, by returning to each said updater process that submitted one of said requests to said receiver process a corresponding transaction commit/abort status from said transaction status table;

store for each updater process a last one of said master image file positions included in one of said requests received from said each updater process, to generate a restart master image file position comprising a lowest one of the stored master image file positions for said updater processes, and to store said restart master image file position in said receiver context record; and regenerate said transaction status table at predefined times using only audit records in said master image file at positions beginning at said restart master image file position.

8. The system of claim 7, each of said updater processes including instructions to store an updater context record including said last one of said master image file positions read by said updater process and an image trail position indicating a last one of said audit records read from said assigned auxiliary trail file, said updater context record used to restore said updater process in the event of a failure.

9. A memory for storing data for access by programs being executed by a distributed computer database system, said database system including a local data processing system in communication with at least one remote data processing system having a backup database system, said local data processing system having a local database system that is at least partially replicated in said backup database system, said programs modifying said database system while said local database processing system restructures said database system, said memory comprising:

an extractor process, for execution by said local data processing system, that includes instructions for:
extracting audit records from an audit trail representing modifications to said local database system,
transmitting said audit records to said remote data processing system, each audit record including an extracted position indicating a location of the audit record in said audit trail, said extractor process including a plurality of message buffers and instructions for buffering groups of said extracted audit records together in said message buffers and transmitting said message buffers to said remote data processing system, each transmitted message buffer having an associated sequence number, wherein sequentially transmitted messages buffers have associated sequence numbers that follow a predefined sequence, said extractor process including instructions for continuing, after transmitting a first one of said message buffers to said remote data processing system, to buffer groups of said extracted audit records in other ones of said message buffers and for transmitting said other message buffers to said remote data processing system, said extractor process further including instructions for requesting and receiving a restart extracted position from said remote data processing system, said restart extracted position indicating a position in said audit trail for continuing the extraction of said audit records; and wherein said extractor process restarts execution from said restart extracted position when at least one predefined condition occurs.

10. The memory of claim 9, wherein said predefined condition occurs when said remote data processing system receives a message buffer having an associated message sequence number that does not follow said predefined sequence.

11. The memory of claim 9, wherein said extractor process includes initialization instructions, which include said error reply message instructions, to allocate and initialize all volatile data structures used by said extractor process and to request said restart audit trail position from said receiver process in order to resume extraction of said audit records at said restart audit trail position whenever said extractor process is started or restarted within said local computer system and whenever said extractor process receives a predefined error message transmitted by said remote data processing system.

12. A memory for storing data for access by programs being executed by a distributed computer database system, said database system including a local data processing system in communication with at least one remote data processing system having a backup database system, said local data processing system having a local database system that is at least partially replicated in said backup database system, said programs modifying said database system while said local database processing system restructures said database system, said memory comprising:

a receiver process executed by said remote data processing system that
receives a plurality of message buffers transmitted from said local data processing system, each transmitted message buffer including a plurality of audit records indicating modifications to said local database system, said audit records extracted from an audit trail file associated with said local database system, each audit record having an associated audit trail position in said audit trail file, each transmitted message buffer having an associated sequence number, wherein sequentially transmitted message buffers have associated sequence numbers that follow a predefined sequence, stores an expected message sequence number, responds to each received message buffer whose associated message sequence number does not match said expected message sequence number by transmitting an error message to said transmitting local data processing system, responds to each received message buffer whose associated message sequence number matches said expected sequence number by updating said expected message sequence number in accordance with said predefined sequence, distributes said audit records in said received message buffer to a plurality of image trail files in said remote data processing system for use in synchronizing said remote database system with said local database system, periodically stores a context record denoting a restart audit trail position based on said audit trail positions associated with said audit records in said received message buffer, and transmits said restart audit trail position to said local data processing system when requested by said local data processing system.

13. The memory of claim 12, wherein said image trail files to which said receiver process distributed audit records consist of at least one master image trail file and one or more auxiliary image trail files, each auxiliary image trail file storing a subset of said audit records denoting modifications to contents of said local database, said master image trail file having a second subset of said audit records, said second subset of said audit records including at least some audit records that each denote a commit/abort status of a respective transaction associated with audit records in said auxiliary image trail files.

14. The memory of claim 13, wherein each of said auxiliary image trail files has an associated auxiliary image buffer and each of said master image trail files has an associated master image buffer, said buffers used to temporarily store said audit records prior to storage in their respective image trail file;

said receiver process including instructions to periodically store said audit records of each auxiliary image buffer in said associated auxiliary image trail file and also to store an associated storage location for each auxiliary image trail file in a receiver context record, said receiver context record used to resume execution of said receiver process when a predefined condition occurs.

15. The memory of claim 14, said receiver process including instructions to:

distribute audit records from each message buffer to said auxiliary image buffers and said master image trail buffer, and for periodically storing in each auxiliary image buffer an associated master image file position denoting a location of a last one of said audit records from said each message buffer distributed to said master image trail buffer;

generate a transaction status table from said audit records denoting a commit/abort status of said respective transactions;

respond to requests from said updater processes for transaction commit/abort status information, each said request from one of said updater processes including a last one of said master image file positions read by the one updater process, by returning to each said updater process that submitted one of said requests to said receiver process a corresponding transaction commit/abort status from said transaction status table;

store for each updater process a last one of said master image file positions included in one of said requests received from said each updater process, to generate a restart master image file position comprising a lowest one of the stored master image file positions for said updater processes, and to store said restart master image file position in said receiver context record; and regenerate said transaction status table at predefined times using only audit records in said master image file at positions beginning at said restart master image file position.

16. The memory of claim 15, each of said updater processes including instructions to store an updater context record including said last one of said master image file positions read by said updater process and an image trail position indicating a last one of said audit records read from said assigned auxiliary trail file, said updater context record used to restore said updater process in the event of a failure.

17. A distributed data processing system having a local computer system having a database system, said local computer system in communication with a remote computer system remotely located from said local computer system, said remote computer system having a backup database system replicating at least a portion of said local database system, comprising:

a plurality of audit records stored in an audit trail associated with said local database system, said audit records reflecting transactions used to modify said local database system, each audit record having an audit trail position in said audit trail;

a sender process, executed by said local computer system, that extracts at least a portion of said audit records from said audit trail and transmits said extracted audit records in one or more groups, wherein each group is transmitted in accordance with a predefined order;

a receiver process, executed by said remote computer system, that receives said groups, said receiver process including instructions to maintain a restart audit trail position based on said received audit records, and to detect when one of said transmitted groups is not received in accordance with said predefined order; and wherein said receiver process initiates reexecution of said sender process to extract said audit records from said restart audit trail position and to retransmit the audit records to the receiver process when one of said transmitted groups is not received in accordance with said predefined order.

18. The system of claim 17, wherein said sender process requests said restart audit trail position in order to resume execution at said restart audit trail position when an operational failure occurs with said sender process.

19. The system of claim 17, wherein said receiver process distributes said received audit records to one or more image trail files that are accessible by one or more updater processes, each updater process, executed by said remote data processing system, reading said audit records and initiating redo operations of said database modifications denoted in at least a subset of said received audit records against said backup database system.

20. The system of claim 19, wherein each received audit record has an associated transaction commit/abort status that is denoted in a corresponding status audit record that is stored by said receiver process in a master image trail file accessible by said remote computer system; and each updater process processes a subset of the audit records from an assigned one of said image trail files, including obtaining the commit/abort status for each audit record in said subset and updates said backup database in accordance with each audit record in said subset which has an associated transaction commit status.

21. The system of claim 19, wherein said image trail files consist of at least one master image trail file and one or more auxiliary image trail files, each auxiliary image trail file including a subset of said audit records denoting modifications to contents of said local database, said master image trail file having a second subset of said audit records, said second subset of said audit records including at least some audit records that each denote a commit/abort status of a respective transaction associated with audit records in said auxiliary image trail files.

22. The system of claim 21, wherein
each of said auxiliary image trail flies has an associated auxiliary image buffer and each of said master image trail files has an associated master image buffer, said buffers used to temporarily store said audit records prior to storage in their respective image trail file;

said receiver process including instructions to periodically store said audit records of each auxiliary image buffer in said associated auxiliary image trail file and also to store an associated storage location for each auxiliary image trail file in a receiver context record, said receiver context record used to resume execution of said receiver process when a predefined condition occurs.

23. The system of claim 22,
said receiver process including instructions to:
distribute audit records from each message buffer to said auxiliary image buffers and said master image trail buffer, and for periodically storing in each auxiliary image buffer an associated master image file position denoting a location of a last one of said audit records from said each message buffer distributed to said master image trail buffer;

generate a transaction status table from said audit records denoting a commit/abort status of said respective transactions;

respond to requests from said updater processes for transaction commit/abort status information, each said request from one of said updater processes including a last one of said master image file positions read by the one updater process, by returning to each said updater process that submitted one of said requests to said receiver process a corresponding transaction commit/abort status from said transaction status table;

store for each updater process a last one of said master image file positions included in one of said requests received from said each updater process, to generate a restart master image file position comprising a lowest one of the stored master image file positions for said updater processes, and to store said restart master image file position in said receiver context record; and regenerate said transaction status table at predefined times using only audit records in said master image file at positions beginning at said restart master image file position.

24. The system of claim 23,
each of said updater processes including instructions to store an updater context record including said last one of said master image file positions read by said updater process and an image trail position indicating a last one of said audit records read from said assigned auxiliary trail file, said updater context record used to restore said updater process in the event of a failure.

25. The system of claim 17, wherein said receiver process includes:
instructions for periodically storing a receiver context record denoting said restart audit trail position and other information needed to restart said receiver process; and initialization instructions to allocate and initialize all volatile data structures used by said receiver process and to recover said restart audit trail position from said receiver context record.

26. A method for operating a distributed computer system including a local computer system having a local database, said local computer system in communication with a remote computer system having a backup database at least partially replicating said local database, said method comprising the steps of:

receiving a plurality of message buffers from said local computer system, each message buffer including at least one audit record and having an associated sequence number, wherein sequentially transmitted message buffers have associated sequence numbers that follow a predefined sequence; each audit record having an associated audit trail position;

storing an expected sequence number based on said associated sequence numbers of said received message buffers and storing a restart audit trail position based on said audit trail positions associated with said audit records in said received message buffers;

sending a reply message to said local computer system for each transmitted message buffer whose associated message sequence number matches said expected sequence number, said reply message enabling reuse of said message buffer; and transmitting an error message to said local computer system indicating the need to resynchronize said transmissions at said restart audit trail position for each transmitted message buffer whose associated message sequence number does not match said expected sequence number.

27. The method of claim 26, further comprising the step of:

distributing said received audit records to a plurality of image trail files, said image trail files to which said receiver process distributes audit records including at least one master image trail file and one or more auxiliary image trail files, each auxiliary image trail file storing a subset of said audit records denoting modifications to contents of said local database, said master image trail file having a second subset of said audit records, said second subset of said audit records including at least some audit records that each denote a commit/abort status of a respective transaction associated with audit records in said auxiliary image trail files.

28. The method of claim 27, further including:
periodically durably storing a receiver context record denoting said restart audit trail position and other information needed to restart said receiver process; and whenever said a receiver process performing said method is started or restarted within said remote computer system, allocating and initializing all volatile data structures used by said receiver process and recovering said restart audit trail position from said durably stored receiver context record.

29. The method of claim 27, wherein each of said auxiliary image trail files has an associated auxiliary image buffer and each of said master image trail files has an associated master image buffer, said buffers used to temporarily store said audit records prior to storage in their respective image trail file;

periodically storing said audit records of each auxiliary image buffer in said associated auxiliary image trail file and durably storing an associated storage location for each auxiliary image trail file in a receiver context record, said receiver context record used to resume execution of said method when a predefined condition occurs.

30. The method of claim 27, including distributing audit records from each message buffer to said auxiliary image buffers and said master image trail buffer, and periodically storing in each auxiliary image buffer an associated master image file position denoting a location of a last one of said audit records from said each message buffer distributed to said master image trail buffer;

generating a transaction status table from said audit records denoting a commit/abort status of said respective transactions;

responding to requests from updater processes for transaction commit/abort status information, each said request from one of said updater processes including a last one of said master image file positions read by the one updater process, by returning to each said updater process that submitted one of said requests to said receiver process a corresponding transaction commit/abort status from said transaction status table;

storing for each updater process a last one of said master image file positions included in one of said requests received from said each updater process, generating a restart master image file position comprising a lowest one of the stored master image file positions for said updater processes, and durably storing said restart master image file position in a receiver context record; and regenerating said transaction status table at predefined times using only audit records in said master image file at positions beginning at said restart master image file position.

31. The method of claim 30, for each of said updater processes, storing an updater context record including said last one of said master image file positions read by said updater process and an image trail position indicating a last one of said audit records read from said assigned auxiliary trail file, and utilizing said updater context record to restore said updater process in the event of a failure.

32. The method of claim 31, storing in said receiver context record said restart audit trail position.

33. A method for operating a distributed computer system having a local computer system in communication with a remote computer system remotely located from said local computer system, said remote computer system having a backup database system for a local database system accessible by said local computer system, said method comprising the steps of:

providing a plurality of audit records stored in an audit trail accessible by said local computer system, each audit record having an associated audit trail position in said audit trail;

extracting said audit records from said audit trail;

continuously transmitting said audit records in one or more groups to said remote computer system, each group transmitted in a predefined sequential order;

temporarily suspending said extraction and transmission steps upon notification from said remote computer system that one of said groups arrived out of the predefined sequential order;

obtaining a restart audit trail position from said remote computer system, said restart audit trail position based on said audit records received by said remote computer system in said predefined sequential order; and resuming extraction and transmission of said audit records, wherein said resumed extraction extracts said audit records from said restart audit trail position.

34. The method of claim 33, wherein said groups are message buffers; and reusing each of said message buffers upon receipt of a reply message from said remote computer system upon successful transmission of one of said message buffers in said predefined sequential order.

35. The method of claim 33, including whenever an extractor process performing said method is started or restarted within said local computer system, and whenever said extractor process receives notification from said remote computer system that one of said groups arrived out of the predefined sequential order, allocating and initializing all volatile data structures used by said extractor process and requesting said restart audit trail position from said remote computer system in order to resume extraction of said audit records at said restart audit trail position.

36. A method for operating a distributed computer system having a local computer system in communication with a remote computer system remotely located from said local computer system, said remote computer system having a backup database system for a local database system accessible by said local computer system, said method comprising the steps of:

establishing a plurality of updater processes;

in each updater process, performing the steps of:
  receiving an image trail file including at least one header record and a plurality of audit records, each header record associated with a set of said audit records, each audit record reflecting modifications to contents of said local database system, each audit record having an associated transaction status record stored in a master image file, said header record having a master image transaction file position;

sequentially processing said records in said image trail file, including
    reading said audit records in said image trail file;
    reading said header records in said image trail file and denoting the master image transaction file position in the last header record read;
    sending requests to another process for transaction commit/abort status information associated with said read audit record, each said request including said denoted master image transaction file position, and receiving from said other process corresponding transaction commit/abort status information;
    for each read audit record having an associated commit status in accordance with said received transaction commit/abort status information, applying said modifications to said backup database reflected in said read audit record; and
    periodically storing in a context record a file position associated with a last record read from said image trail file and said denoted master image transaction file position; and in said other process, determining a restart master image file position from the master image transaction file positions included in said requests sent by said updater processes, generating a transaction status table using only transaction status records in said master image file at positions beginning at said restart master image file position, and using said generated transaction status table to obtain said transaction commit/abort status information to send to said updater processes in response to said requests sent by said updater processes.

* * * * *